United States Patent [19]

Tsutsumishita

[11] Patent Number: 5,721,546
[45] Date of Patent: Feb. 24, 1998

[54] ENCODER UNIT FOR PROVIDING TO A SERVO MOTOR CONTROL UNIT POSITION DATA WHICH IS ADJUSTED TO ACCOUNT FOR PROCESSING DELAYS

[75] Inventor: Youji Tsutsumishita, Aichi, Japan

[73] Assignee: Mitsubishi Denki Kabushiki Kaisha, Tokyo, Japan

[21] Appl. No.: 536,182

[22] Filed: Sep. 29, 1995

[30] Foreign Application Priority Data

Mar. 24, 1995 [JP] Japan ................ 7-066443

[51] Int. Cl.$^6$ ........................................... H03M 1/48
[52] U.S. Cl. ........................................... 341/116
[58] Field of Search .................... 341/1, 11, 115; 318/609, 610, 611

[56] References Cited

U.S. PATENT DOCUMENTS

| | | |
|---|---|---|
| 4,991,100 | 2/1991 | Matsui . |
| 5,486,997 | 1/1996 | Reismiller et al. .......... 364/153 |

FOREIGN PATENT DOCUMENTS

| | | |
|---|---|---|
| 0047872 | 3/1982 | European Pat. Off. . |
| 0399989 | 11/1990 | European Pat. Off. . |
| 3-243759 | 5/1984 | Germany . |
| 3815534 | 11/1989 | Germany . |
| 3821938 | 1/1990 | Germany . |
| 3924422 | 2/1990 | Germany . |
| 9-320346 | 10/1993 | Germany . |
| 62-260574 | 11/1987 | Japan .................. H02P 5/00 |
| 1-124769 | 5/1989 | Japan .................. G01P 3/489 |
| 5-110441 | 4/1993 | Japan .................. H03M 1/82 |
| 5-65827 | 9/1993 | Japan . |

OTHER PUBLICATIONS

D. Naunin and H. Reuss "Synchronous Servo Drive . . . " in IEEE Transactions on Industry Appl. 1990 vol. 3, pp. 408–414.

J. Ackermann, "abtastregelung" 2nd edition, 1983, Springer–Verlag, Berlin, vol. I, pp. 5–13.

Primary Examiner—Brian K. Young
Attorney, Agent, or Firm—Sughrue, Mion, Zinn, Macpeak & Seas, PLLC

[57] ABSTRACT

In an encoder unit for interpolating analog signals such as sine waves and triangular waves to obtain higher resolution or absolute values through A/D conversion and arithmetic processing, a delay time of data which is caused by A/D conversion and arithmetic processing time is eliminated to prevent deterioration of control performance. A storage unit for holding detected angular data and an output compensation unit for compensating the delay time are provided and a position change occurring during the delay time is predicted by the output compensation unit from angular data obtained from current and previous sampling cycles, and the delay time is compensated by adding the predicted position change to the current sampling data. Deterioration of the control performance can be prevented and inexpensive low-speed A/D converter and arithmetic processor can be used, and, therefore, required costs can be reduced.

7 Claims, 23 Drawing Sheets

AFTER Tn−1 SAMPLING

AFTER Tn SAMPLING

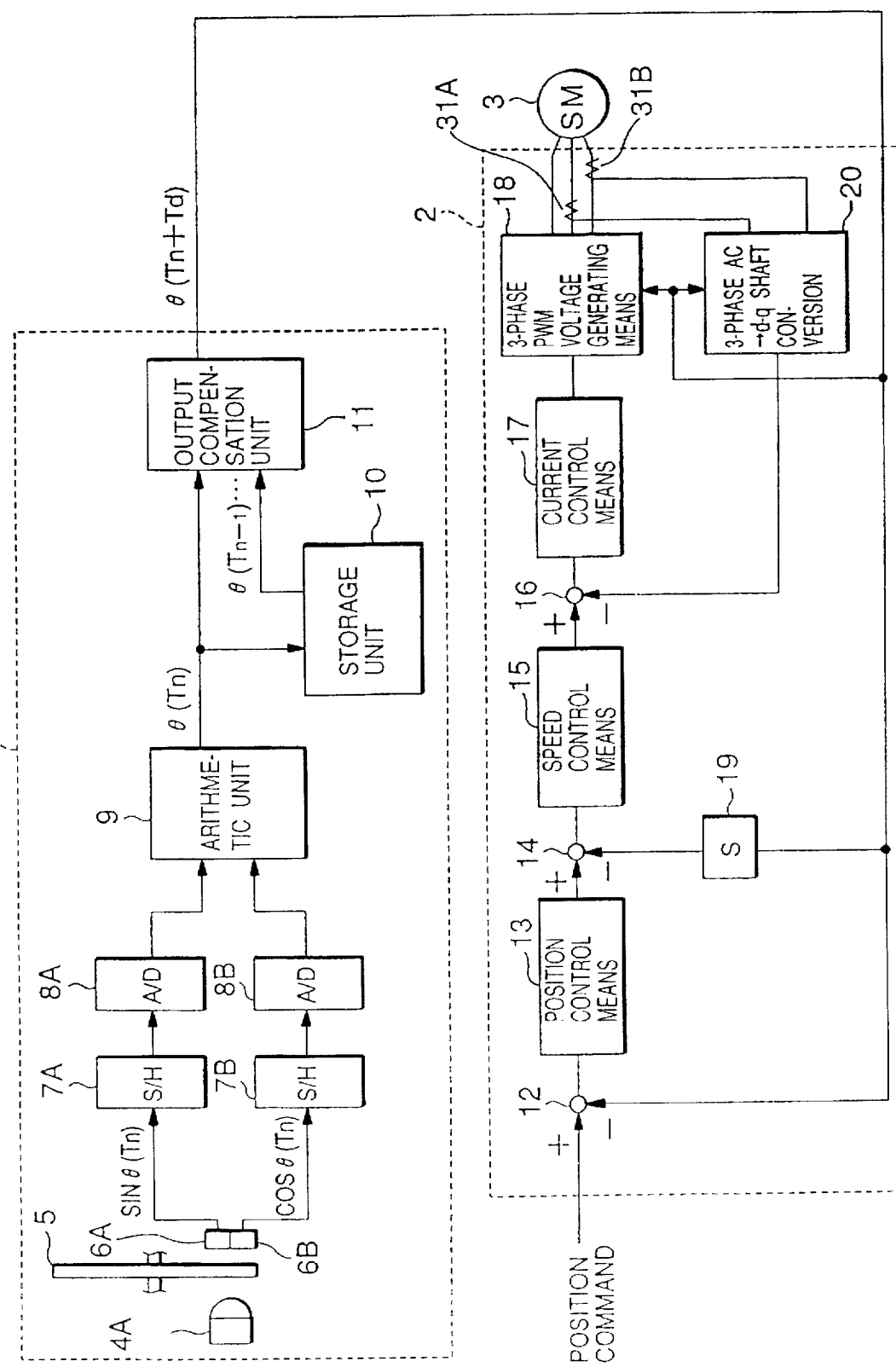

ENCODER UNIT FOR PROVIDING TO A SERVO MOTOR CONTROL UNIT POSITION DATA WHICH IS ADJUSTED TO ACCOUNT FOR PROCESSING DELAYS

BACKGROUND OF THE INVENTION

1. Field of the Invention

The present invention relates to an encoder unit for detecting a position on a machine tool or the like and a servo motor control unit for controlling a servo motor according to position data obtained from the encoder unit.

2. Description of Prior Art

For the purpose of providing the encoder unit with high resolution or obtaining an absolute value encoder unit, a method as, for example, disclosed in the Patent Publication Gazette HEI. 5-65827, is known by which analog signals such as sine waves and triangular waves to be outputted in accordance with the rotation angle and analog signals having a specified phase difference from the analog signals are A/D converted and the result of conversion is interpolated by arithmetic operation. FIG. 22 is a configuration diagram of a conventional encoder control apparatus according to the above-described method. In FIG. 22, reference numeral 1 denotes an encoder unit which is installed on a servo motor 3 or a moving part of a machine. Motor drive unit 2 controls the servo motor 3 with a position command from an external source and an output of the encoder unit 1.

The following describes the details of the encoder unit 1 and motor drive unit 2 of FIG. 22. A quantity of light emitted from LED 4A to reach light receiving devices 6A and 6B such as photo diodes and photo transistors is changed by a shield plate 5 installed on a motor shaft or a moving part of a machine, and the light receiving devices 6A and 6B generate signals proportional to the quantity of light. These signals are analog signals such as sine waves or triangular waves which are phase-offset by 90° relative to each other. These analog signals are simultaneously held by sample-and-hold circuits 7A and 7B and entered into A/D converters 8A and 8B. Data digitized by the A/D converter is converted to position data by an arithmetic unit 9 and outputted to the motor drive unit 2. The arithmetic unit 9 comprises a divider and a ROM table.

Operation of the motor drive unit 2 is described below. A subtractor 12 outputs a difference between a position command and an output θ(Tn) of the encoder unit 1 and a position control means 13 generates a speed command value in accordance with this difference. A subtractor 14 outputs a difference between the speed command value and the speed feedback value obtained by differentiating θ($T_n$) in a differentiator 19 and a speed control means 15 generates a current command value in accordance with this difference. A subtractor 16 outputs a difference between the current command value and the current feedback value, and a current control means 17 generates a voltage command value in accordance with this difference. A 3-phase PWM voltage generating means 18 outputs a 3-phase voltage in response to the voltage command and controls the servo motor which is a synchronous motor. Specifically, the 3-phase PWM voltage generating means determines a magnetic pole position of the motor from the output θ($T_n$) of the encoder, and outputs a 3-phase voltage in accordance with the current magnetic pole position. In the current feedback loop, the 3-phase alternating current is detected by the current detectors 31A and 31B, converted to a torque component current at a 3-phase AC→d-q axis converter 20 and used for controlling the current. In this case, the 3-phase AC→d-q axis converter 20 determines the magnetic pole position of the motor from the output θ($T_n$) of the encoder and carries out conversion in accordance with the current magnetic pole position.

A data processing timing chart of the conventional encoder unit is shown in FIG. 23. Holding by sample-and-hold circuits 7A and 7B is generally cyclic holding according to a request signal given by the motor drive unit 2. When a signal is held, the A/D converters 8A and 8B start A/D conversion. After completion of A/D conversion, the data is arithmetically processed by the arithmetic unit 9 and angular data θ($T_n$) at time $T_n$ is outputted at time $T_n+T_d$. The motor drive unit 2 executes the control from time $T_n+T_d$. This angular data is outputted as serial signals in most cases.

As described above, a large delay time is taken in A/D conversion, arithmetic processing and serial communication from holding of analog signals to data transfer to the motor drive unit 2.

As a speed detection method with compensation of the delay time, a method as disclosed, for example, in Patent Application Disclosure Gazette SHO. 62-260574 is known to predict $V_{(n+1)}$ from a previously detected speed $V_{(n-1)}$ and a currently detected speed $V_n$. In this case, the relationship is represented by the following arithmetic equation:

$$V_{(n+1)}=2V_{(n)}-V_{(n-1)}$$

This compensation method is intended to implement linear extrapolation for linear increase or decrease shown in FIG. 24. A concept diagram for applying this compensation method to position detection of the encoder unit to predict and compensate the sampling cycle T0 (where T0=$T_n-T_{n-1}$) and the delay time $T_d$ is shown in FIG. 26 and a block diagram of the compensation unit is shown in FIG. 28.

A method for curvilinear extrapolation based on assumption that a variation component in the sampling cycle increases or decreases at a specified increment or decrement as shown in FIG. 25 is also easily considered. In this case, the relationship is represented by the following arithmetic equation:

$$V_{(n+1)}=3V_{(n)}-3V_{(n-1)}+V_{(n-2)}$$

A concept diagram for applying this method to position detection of the encoder unit to predict and compensate the sampling cycle T0 and the delay time $T_d$ is shown in FIG. 27 and a block diagram of the compensation unit is shown in FIG. 29.

Since the conventional encoder unit is constructed as described above, a delay time occurs before the position data is outputted in response to a request from a servo amplifier. The position data outputted does not therefore coincide with a true angle and includes a delay time. The motor drive unit 2 controls the motor according to the position data with such delay. Though the position control means 13 generally has had a low loop gain of the control system and is rarely affected by the delay time, the speed control means 15 has a high loop gain and is required to provide high frequency responses; thus, the delay time in the encoder output, which causes a same delay time in speed control, results in deterioration of the control performance.

When a synchronous motor is used as the servo motor, the magnetic pole position data of the motor is required for the 3-phase PWM voltage generating means 18 and the 3-phase AC→d-q axis converter 20 as described above. However, the problem exists that, if the encoder output data includes a delay, an error of magnetic pole detection, particularly in high speed rotation of the motor, becomes large and the motor output torque is greatly reduced.

The above problems can be relieved by speeding up A/D conversion and arithmetic operation. However, this approach is disadvantageous in that a high speed A/D converter and an arithmetic processing unit, which are very expensive, must be used.

Additionally, the reliability of high speed serial communication is limited.

The following describes the problems resulting from the use of the compensation method shown in FIGS. 28 and 29 for predicting and calculating a position change occurring during the detection delay. For example, as shown in FIGS. 30 and 31, it is assumed that the motor stays at a position $\theta 0$ nearby the border line of 80 and 81 until time $T_{n-1}$, then moves into the area of the position 81 across the border line at time $T_n$, and returns to the original position at time $T_{+1}$. In this case, (delay time $T_d$)=(sampling cycle T0) is assumed for convenience. In case of compensation by linear extrapolation, equations are as follows.

$$\theta(T_{n+1})=2\theta(T_n)-\theta(T_{n-1})=2$$

$$\theta(T_{n+2})=2\theta(T_{n+1})-\theta(T_n)=-1$$

The encoder output fluctuates in a width of three pulses despite that an actual behavior of the motor is as small as less than the minimum unit of detection. This fluctuation is fed back to the motor drive unit 2 to result in increasing of vibration when the motor is stopped.

In case of compensation by curvilinear extrapolation shown in FIG. 29, equations are as given below.

$$\theta(T_{n+1})=3\theta(T_n)-3\theta(T_{n-1})+\theta(T_{n-2})=3$$

$$\theta(T_{n+2})=3\theta(T_{n+1})-\theta(T_n)=-3$$

As shown in FIG. 32, the encoder output fluctuates in a width of six pulses to result in further increasing vibration when the motor is stopped.

The position of the motor cannot be smoothly detected even in low speed movement of the motor for a relation to the minimum unit of detection of the encoder unit and, if compensation shown in FIGS. 28 and 29 is carried out, an error less than the minimum unit of detection is amplified and outputted to increase unevenness of rotation. This phenomenon is shown in FIG. 33. In FIG. 33, an operation for accelerating in a reverse direction after the speed has been reduced to zero is shown as an example. Vertical scales denote the detection borders of the encoder and the horizontal scales indicate the sampling time.

As described above, the conventional method for predicting and compensating the delay time cannot be directly applied to the encoder unit.

An object of the present invention is to solve the aforementioned problems by providing: an encoder unit capable of outputting position data free from time delay and performing accurate position detection; and a servo motor control unit capable of very precisely controlling the servo motor according to position data received from the encoder unit.

SUMMARY OF THE INVENTION

In order to overcome the aforementioned problems, the servo motor control unit described herein comprises an encoder unit which includes encoder output compensating means which uses the position data obtained from current sampling and previous samplings to predict a position change of a detected object (e.g., a servo motor) during a delay time required to output position data from sampled analog detection signals. The encoder output compensating means outputs a predicted position change that occurs during the delay time as well as predicted position data obtained by adding the predicted position change to the currently sampled position data.

The servo motor control unit further comprises a motor drive unit comprising: position control means for generating a speed command value in response to a difference between a position command and the currently sampled position data; speed control means for generating a current command value in response to a difference between the speed command value and a speed feedback value obtained from the predicted position changed; conversion means for converting a 3-phase alternating current detected from the servo motor to a torque component current and performing conversion in accordance with a current magnetic pole position where the servo motor is a synchronous motor; current control means for generating a voltage command value in response to a difference between the current command value and a current feedback value generated by the conversion means; and voltage generating means for outputting a 3-phase voltage in response to a current magnetic pole position from the predicted position data.

According to a first embodiment, the encoder output compensation means calculates the predicted position change that occurs during the delay time required for sampling analog signals and outputting position data, by selecting the smaller of: the absolute value of the position change in the current sampling cycle; and the absolute value of the position change in the preceding sampling cycle, using the assumption that the position change during the sampling cycle changes linearly or curvilinearly with respect to the position in accordance with the selected position change, and for compensating output position data.

According to a second embodiment, the encoder output compensation means calculates the predicted position change that occurs during the delay time required for sampling analog signals and outputting position data, by selecting: 1) the smaller of the absolute value of the position change in the current sampling cycle, and the absolute value of the position change in the preceding sampling cycle; and 2) the smaller of: a difference between the position change in the current sampling cycle and the position change in the preceding sampling cycle, and a difference between the position change in the preceding sampling cycle and the position change in the sampling cycle occurring prior to the preceding sampling cycle, and using the assumption that the position change in the sampling cycle changes linearly or curvilinearly in accordance with a sum of the selected position change and the selected position change difference.

According to a third embodiment, the encoder output compensation means calculates the predicted position change that occurs during the delay time required for sampling analog signals and outputting position data, by assuming that the position change during the sampling cycle changes linearly or curvilinearly in accordance with a mean value of the position change during the current sampling cycle and the position change during the preceding sampling cycle.

According to a fourth embodiment, the encoder output compensation means calculates the predicted position change that occurs during the delay time required for sampling analog signals and outputting position data, by assuming that the position change during the sampling cycle changes linearly or curvilinearly in accordance with a sum of a mean value of the position changes obtained from the position change in the current sampling cycle and the position change in the sampling cycle occurring prior to the preceding sampling cycle and a mean value of the differences between the position change in the preceding sampling cycle and the position change in the sampling cycle occurring prior to the preceding sampling cycle.

According to a fifth embodiment, the encoder output compensating means calculates a predicted position change from position data obtained in the current sampling and preceding samplings, and includes a variable multiplier for reducing the predicted position change when the position change in the current sampling cycle is small.

According to a sixth embodiment, the encoder output compensation means evaluates in advance a relationship between a current value to be outputted from the motor drive unit and a degree of variation in the position change in the sampling cycle, and calculates the predicted position change that occurs during the delay time, based upon the evaluated relationship and the currently sampled position data.

According to a seventh embodiment, there is provided: signal generating means for generating analog signals corresponding to a rotation angle of a revolving shaft; A/D conversion means for sampling the analog signals and converting them to digital data; arithmetic operation means for obtaining a rotation angle of the revolving shaft from converted digital data; pulse signal generating means for generating pulses the phases of which are phase-offset by 90° relative to each other; a counter for counting the number of said pulses; and encoder output compensation means for outputting a sum of 1) a rotation angle measured by the counter from sampling of the analog signals to completion of calculation of the rotation angle, and 2) a rotation angle calculated from the analog signals as a current angle.

BRIEF DESCRIPTION OF THE DRAWINGS

FIG. 4 is a block diagram showing the encoder unit and the servo motor control unit according to the first embodiment of the present invention.

DESCRIPTION OF THE PREFERRED EMBODIMENTS

Figure 1:
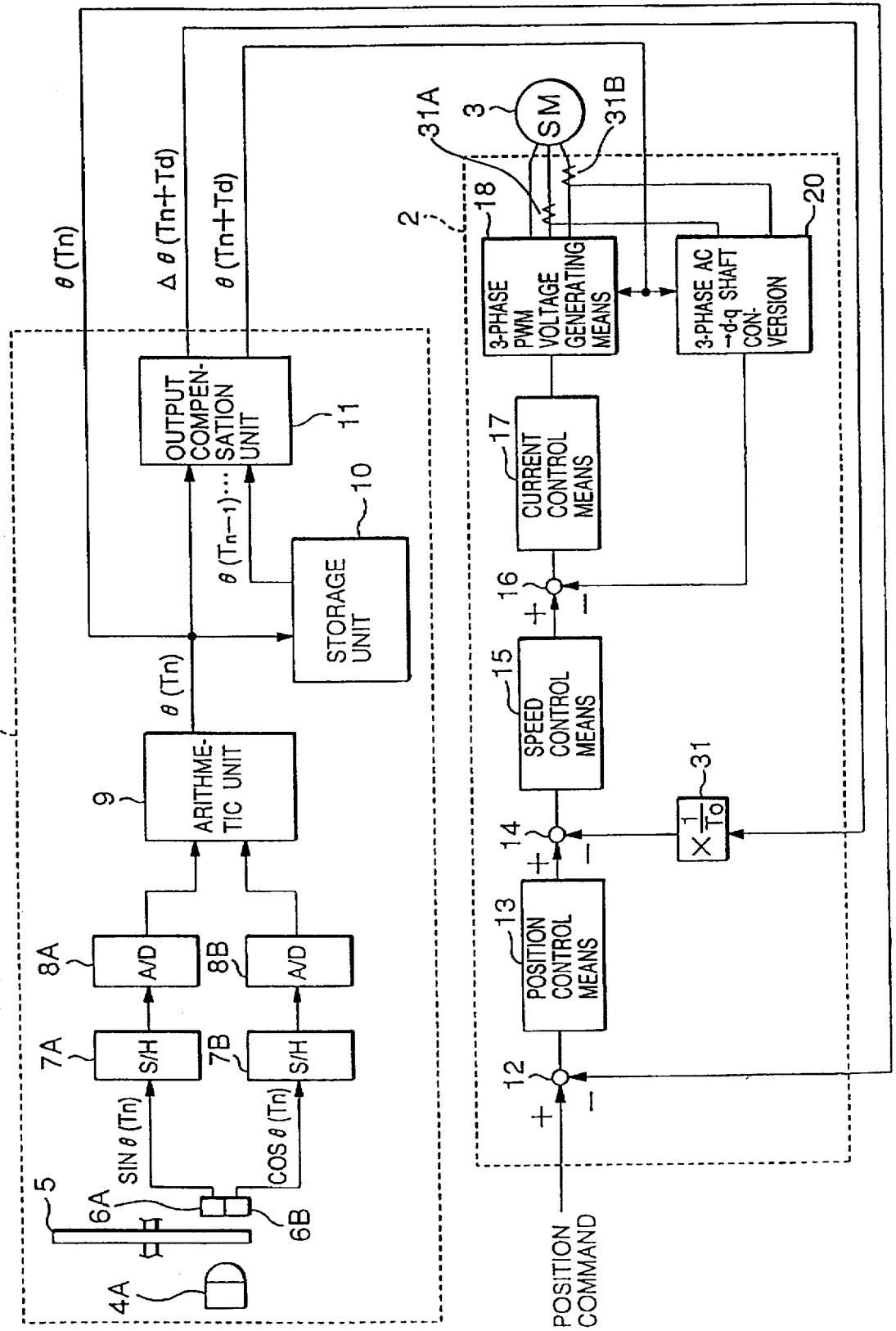
FIG. 1 is a block diagram showing the encoder unit and the servo motor control unit according to the present invention.
Figure 3A:
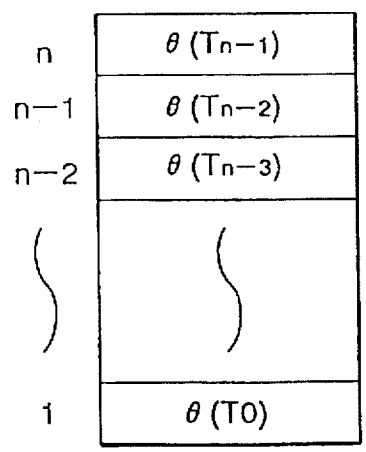
FIG. 3 is an illustration showing the operation of the storage unit of the encoder unit according to the present invention.
Figure 3B:
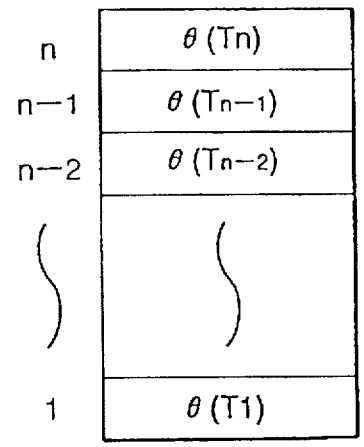
Figure 22:
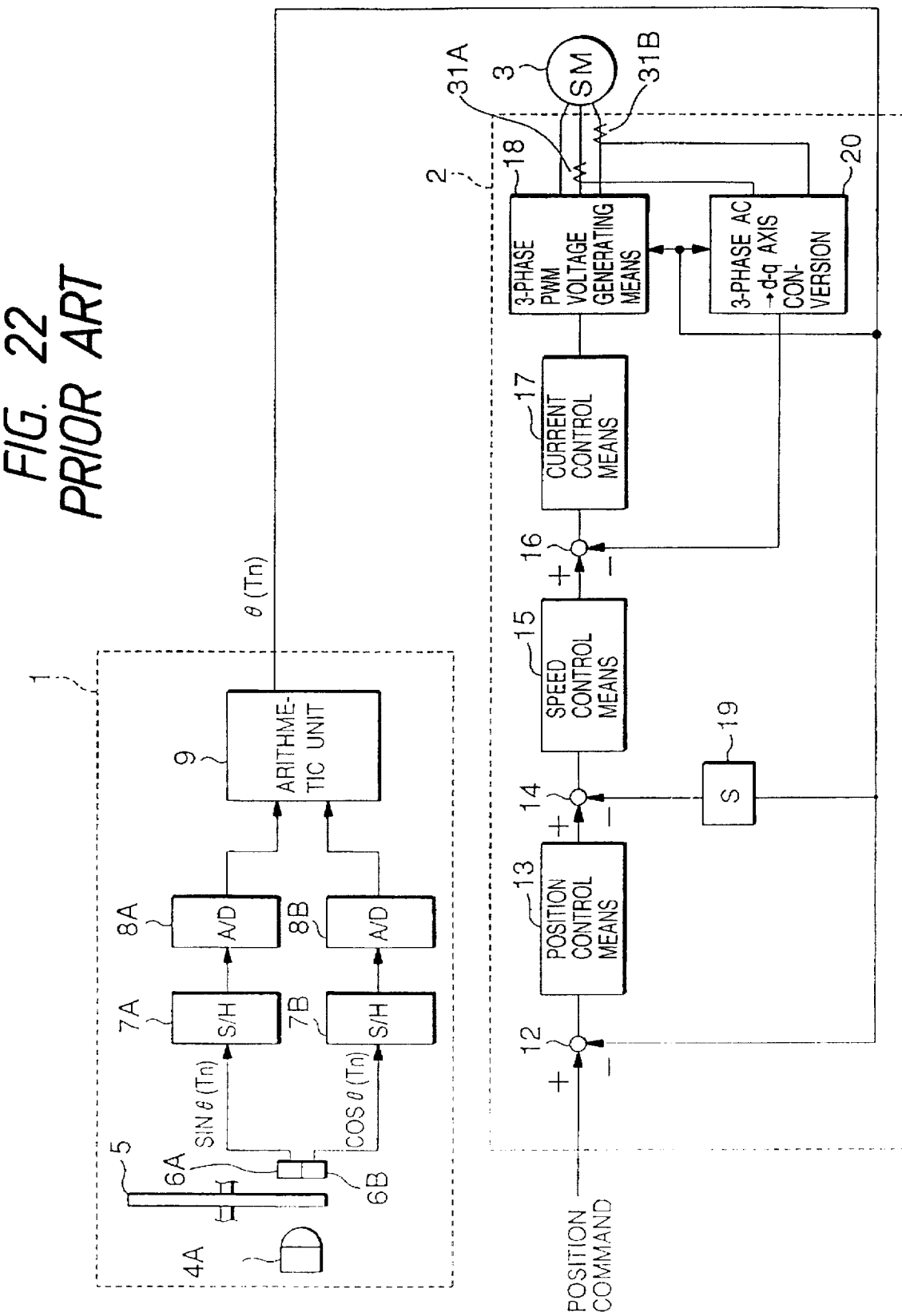
FIG. 22 is a block diagram showing the conventional encoder unit and servo motor control unit.

The embodiments of the present invention are described in detail below. FIG. 1 is a configuration of an encoder unit and a servo motor control unit according to the present invention. In FIG. 1, those elements corresponding to the same elements shown in FIG. 22 are given the same reference numerals and the description is omitted. An output $\theta(T_n)$ of an arithmetic unit 9 (which is arithmetic operation means) is outputted to a motor drive unit 2 and an encoder output compensation unit (hereafter referred to as the output compensation unit 11 which is output compensation means) and is stored in a storage unit 10. The storage unit 10 stores the n latest position data as shown in FIG. 3 and outputs stored position data according to a request of the output compensation unit 11. The output compensation unit 11 outputs predicted position data $\theta(T_n+T_d)$ at a time $T_n+T_d$, which is compensated for a delay equal to a delay time $T_d$ in arithmetic operation and a predicted position change $\Delta\theta(T_n+T_d)$ in the sampling cycle at time $T_n+T_d$, based upon past sampling position data $\theta(T_{n-1})$, $\theta(T_{n-2})$, ... and the current position data $\theta(T_n)$. The output compensation unit 11 is a delay time compensation unit of the type shown in FIGS. 28 and 29 or an output compensation unit shown in the first through sixth embodiments.

A loop gain in the position control is generally small (approximately 30 rad/s) and rarely is affected by a time delay of detection. If inaccurate data is fed back as in the description of conventional delay time compensation, the feedback data increases unevenness of vibration and speed. Therefore the current position data $\theta(T_n)$ is entered into a subtractor 12 of the motor drive unit 2 and used for position control.

A speed feedback value is generated by dividing the predicted position change $\Delta\theta(T_n+T_d)$ in the sampling cycle at time $T_n+T_d$ by the sampling cycle $T0$ in a divider 31 and is used for speed control. Thus, data which is free from the delay time is used in the high-loop-gain speed control to prevent deterioration of the control performance. Though a 3-phase PWM voltage generating means 18 (which is voltage generating means) and a 3-phase AC→d-q axis converter 20 (which is conversion means) are not affected by a slight position error and uneven results of detection, a large deviation of position due to the delay time will incur a reduction of the motor torque, and, therefore, the predicted position data $\theta(T_n+T_d)$ at time $T_n+T_d$ free from the delay time is used.

Figure 2:
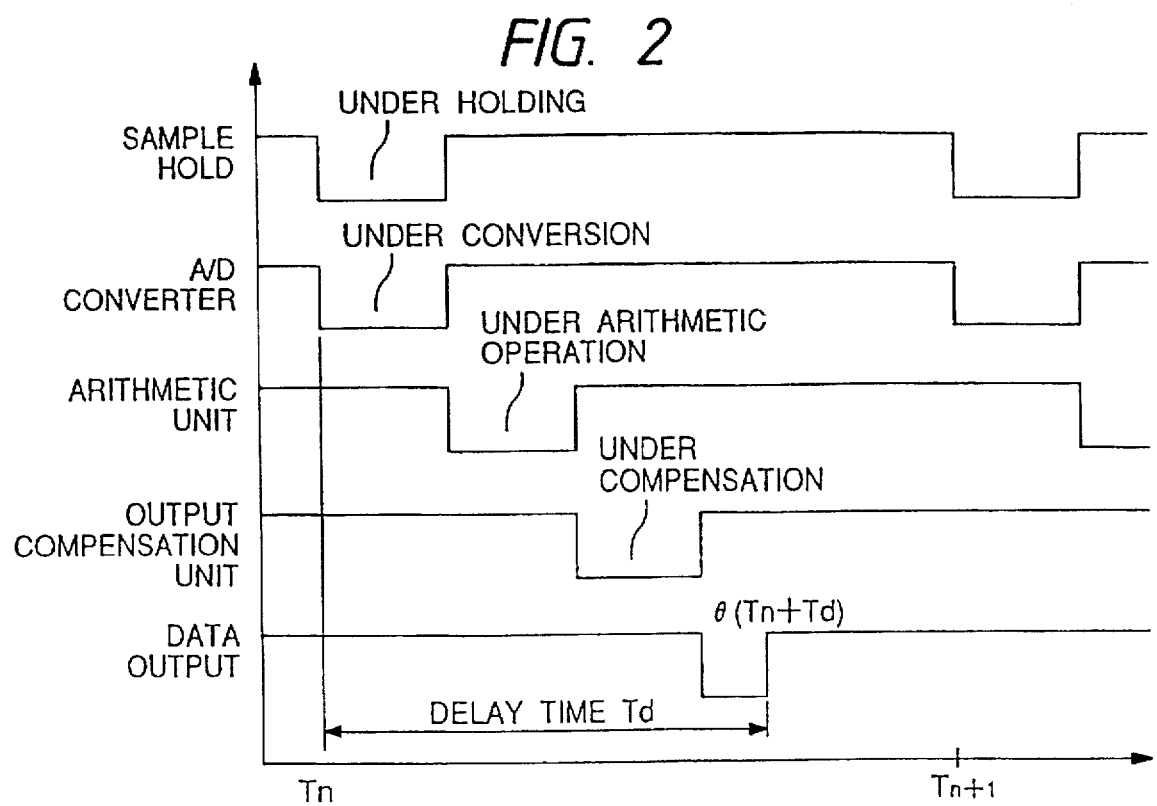
FIG. 2 is a timing chart showing the operation of the encoder unit shown in FIG. 1.
Figure 23:
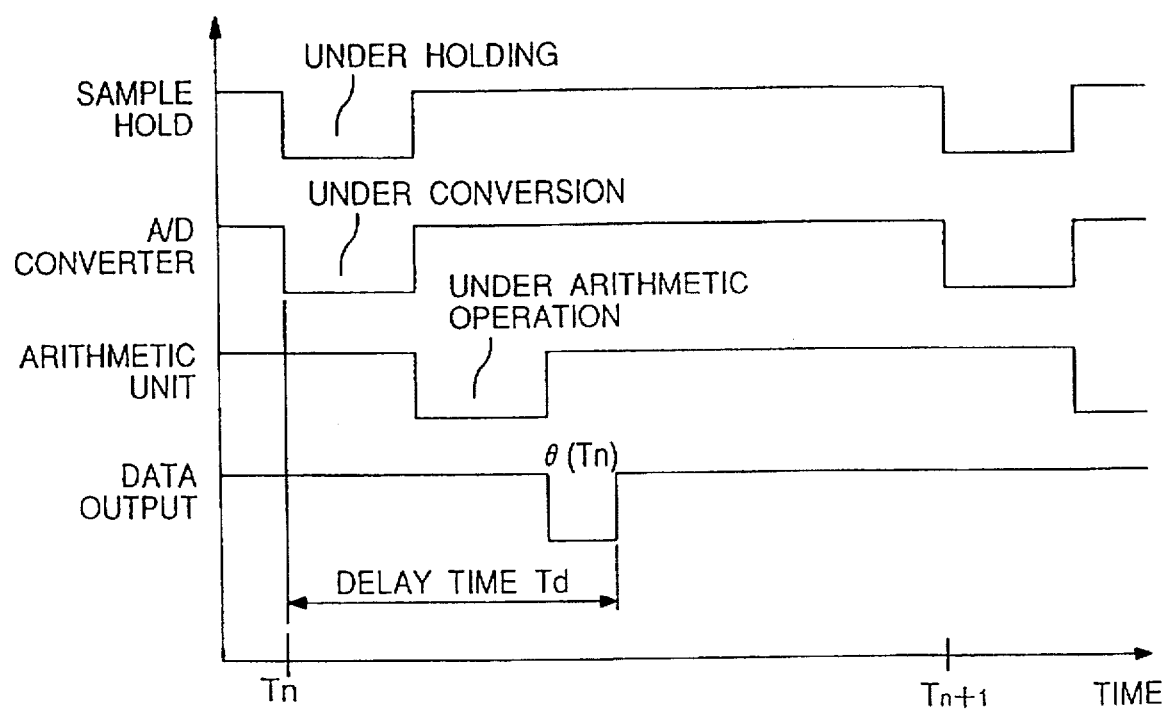
FIG. 23 is a timing chart showing the operation of the conventional encoder unit.
Figure 24:
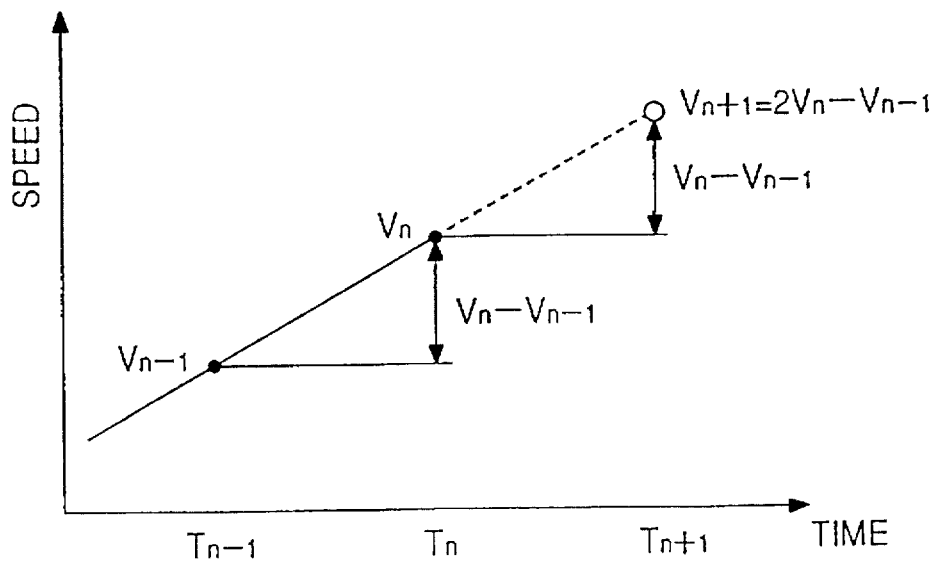
FIG. 24 is a graph illustrating the conventional example of delay time compensation in speed detection.
Figure 25:
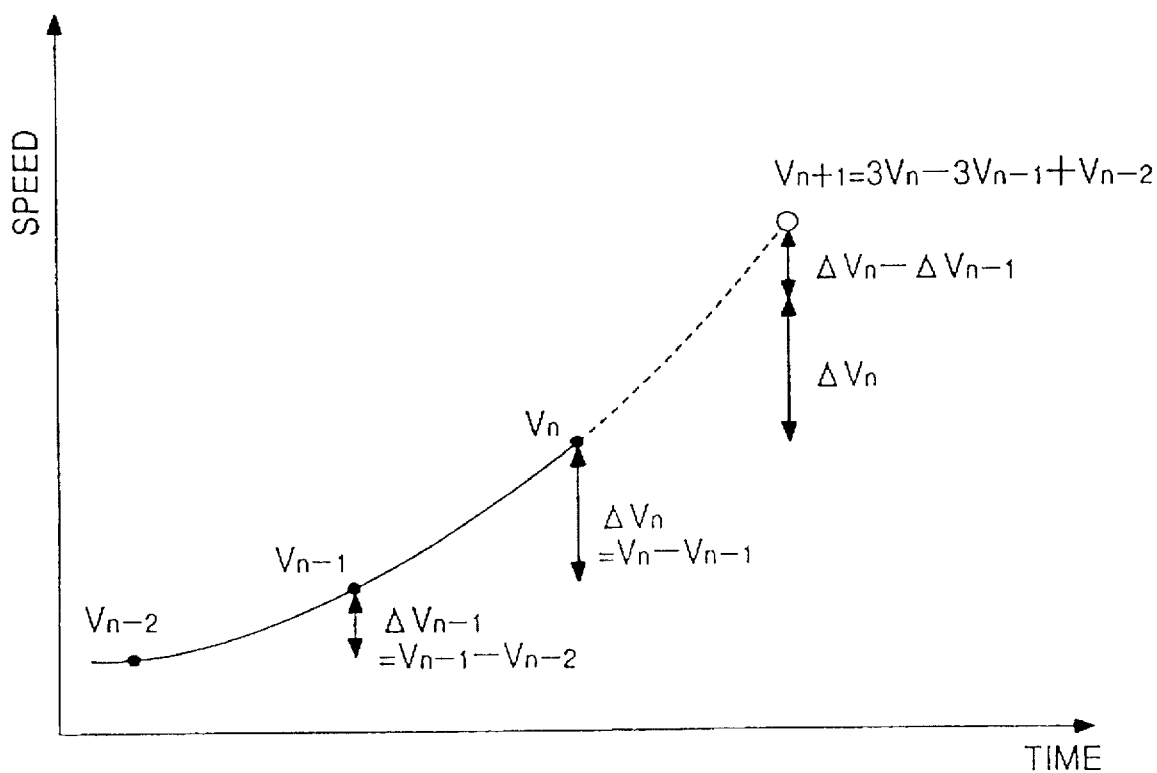
FIG. 25 is a graph illustrating the conventional example of delay time compensation in speed detection.
Figure 26:
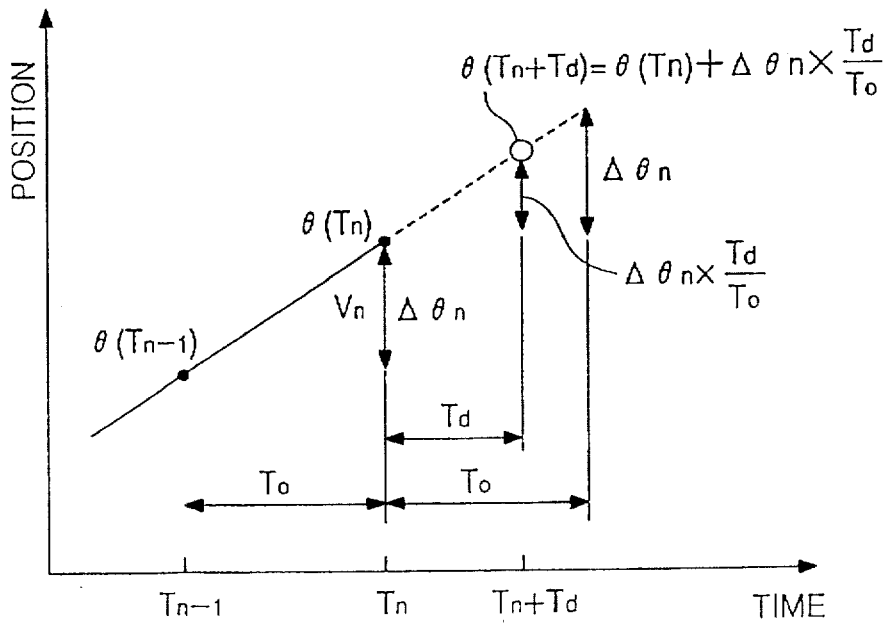
FIG. 26 is a graph illustrating the compensation operation when the conventional delay time compensation applies to the encoder unit.
Figure 27:
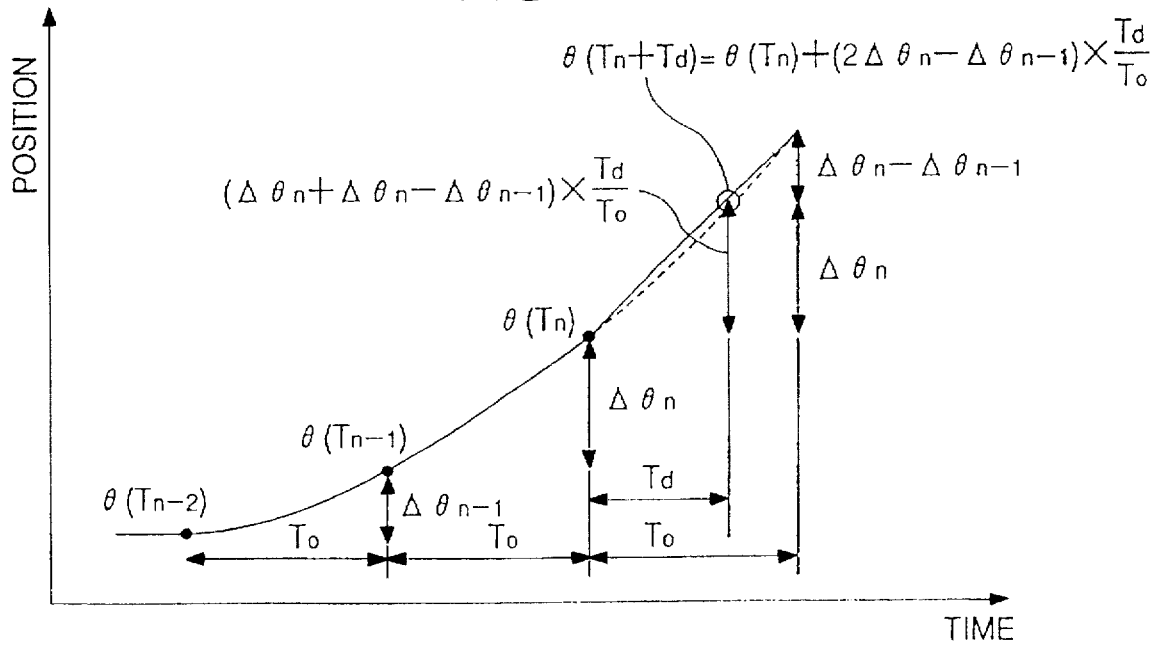
FIG. 27 is a graph illustrating the compensation operation when the conventional delay time compensation applies to the encoder unit.

A data processing timing chart of the encoder unit according to the present invention is shown in FIG. 2. Though the operation timings of all blocks are the same as those in the conventional example shown in FIG. 23, the data to be outputted is the position data at time $T_n+T_d$ when data output is completed and a delay time is eliminated.

First Embodiment

The first through sixth embodiments show internal embodiments of the output compensation unit 11. Since these embodiments are intended to solve the problems of the conventional delay time compensation method, the overall configuration of the encoder unit can be the above-described configuration illustrated in FIG. 1 or a configuration which outputs only the position data $\theta(T_n+T_d)$ which is compensated for the delay time as shown in FIG. 4.

Figure 5:
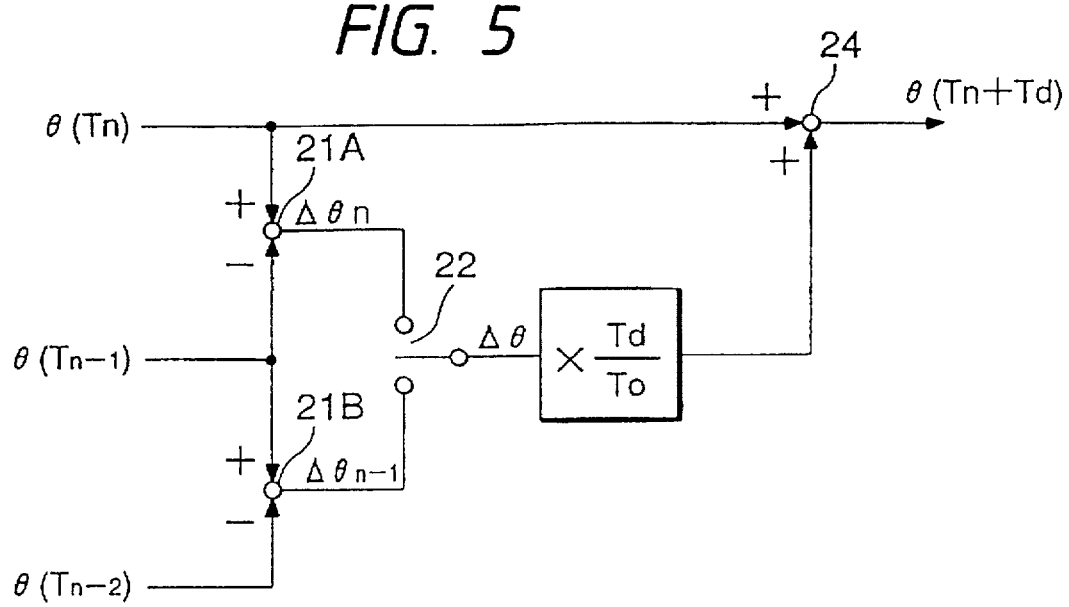
FIG. 5 is a block diagram showing the output compensation unit of the encoder unit according to the first embodiment of the present invention.
Figure 7:
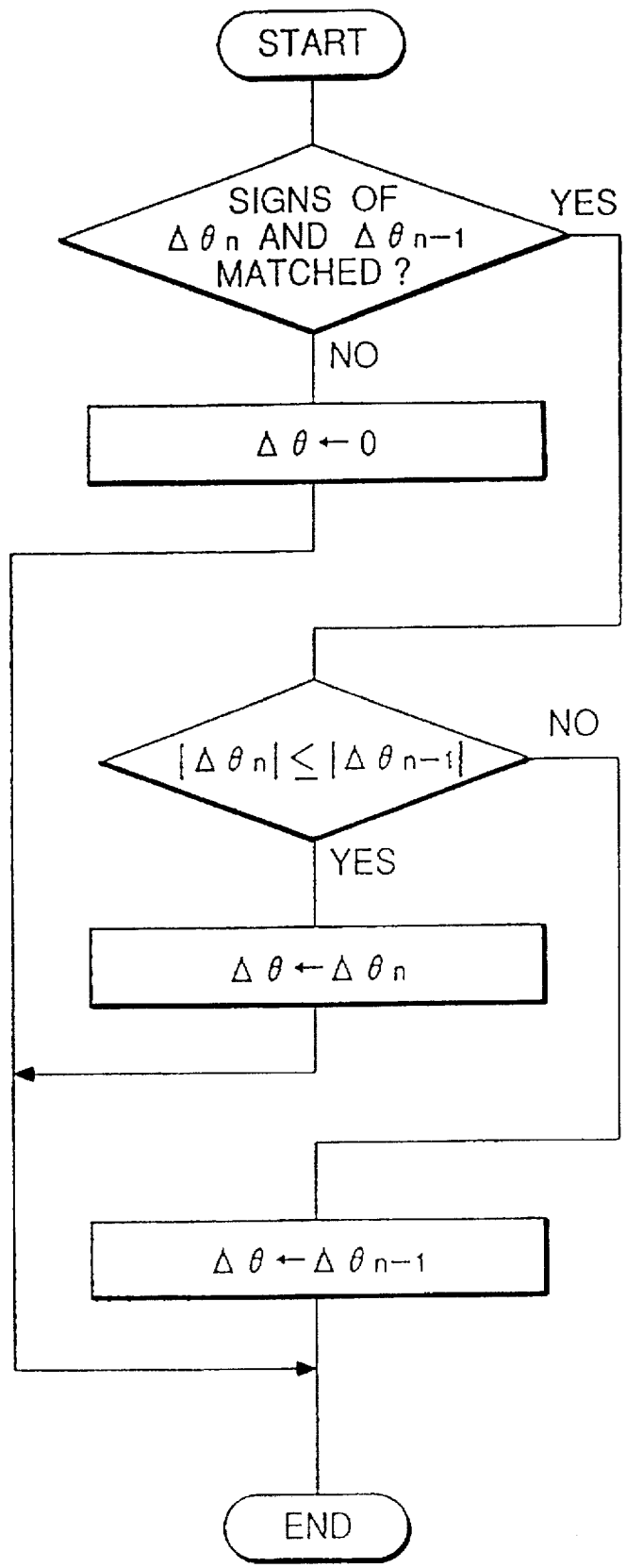
FIG. 7 is a flow chart showing the operation of switches of the encoder unit according to the present invention.

FIG. 5 is a configuration diagram showing an output compensation unit of an encoder unit according to the first embodiment of the present invention. In FIG. 5, the subtractor 21A outputs a difference between the current sampling position $\theta(T_n)$ and the preceding sampling position $\theta(T_{n-1})$; that is, a position change $\Delta\theta n$ during the current sampling cycle. The subtractor 21B outputs a difference between the preceding sampling position $\theta(T_{n-1})$ and a sampling position preceding the preceding sampling position (at the time n-2) $\theta(T_{n-2})$, that is, a position change $\Delta\theta(n-1)$ in the preceding sampling cycle. The smaller of $\Delta\theta n$ and $\Delta\theta(n-1)$ is selected by the selector switch 22 as the current position change to be entered into the multiplier 23. A position change between times $T_n$ and $T_n+T_d$ is obtained by multiplying the selected position change $\Delta\theta$ by $T_d/T0$ (recall that $T0$ is the sampling time) in the multiplier 23. Compensation of the delay time is carried out by adding the output obtained to $\theta(T_n)$ in the adder 24. The operation flow chart of this selector switch 22 is shown in FIG. 7. If the sign of $\Delta\theta n$ differs from that of $\Delta\theta(n-1)$, $\Delta\theta=0$ is given and, if their signs are the same, the smaller absolute value is regarded as $\Delta\theta$.

Figure 10:
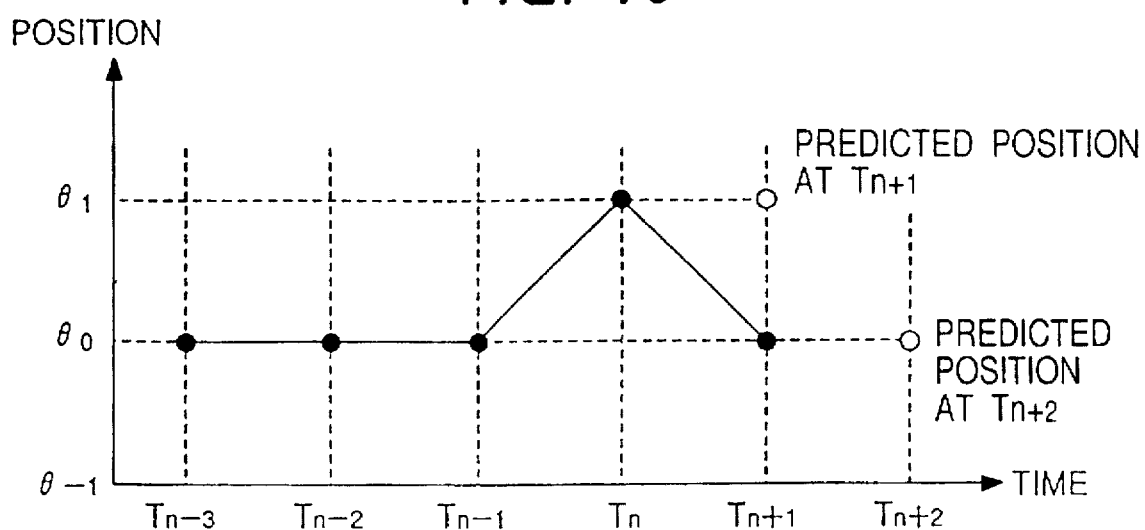
FIG. 10 is a graph showing the operation at a position nearby the detection border of the output compensation unit of the encoder unit according to the first and third embodiments of the present invention.
Figure 12:
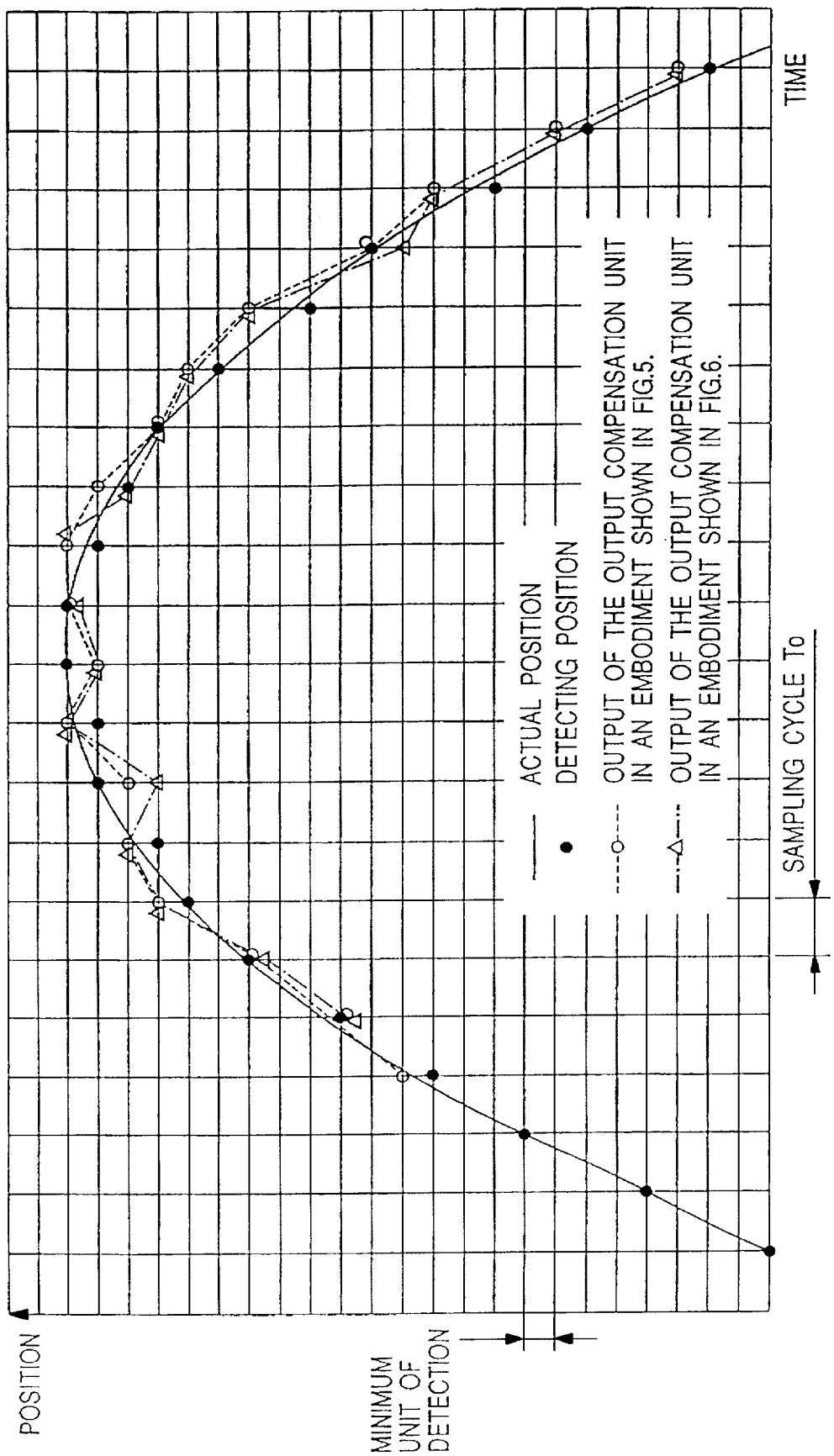
FIG. 12 is a graph showing the operation of the output compensation unit of the encoder unit according to first and second embodiments of the present invention.
Figure 30:
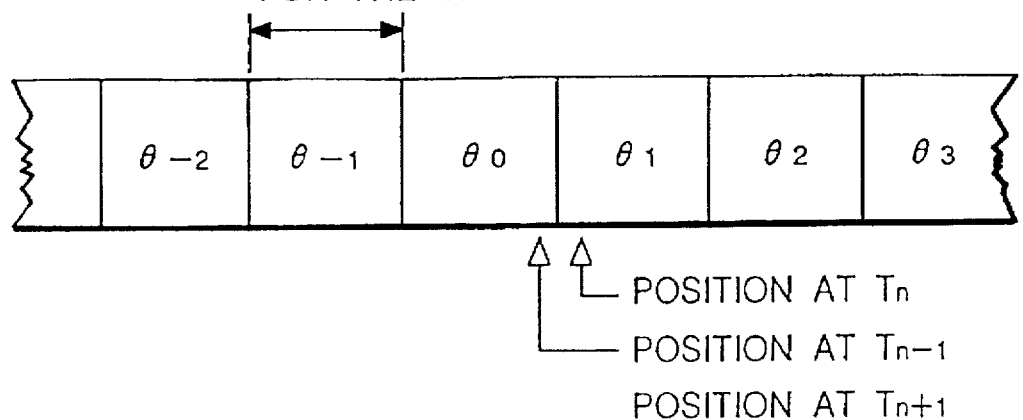
FIG. 30 is a diagram illustrating the problem in the conventional delay time compensation.
Figure 31:
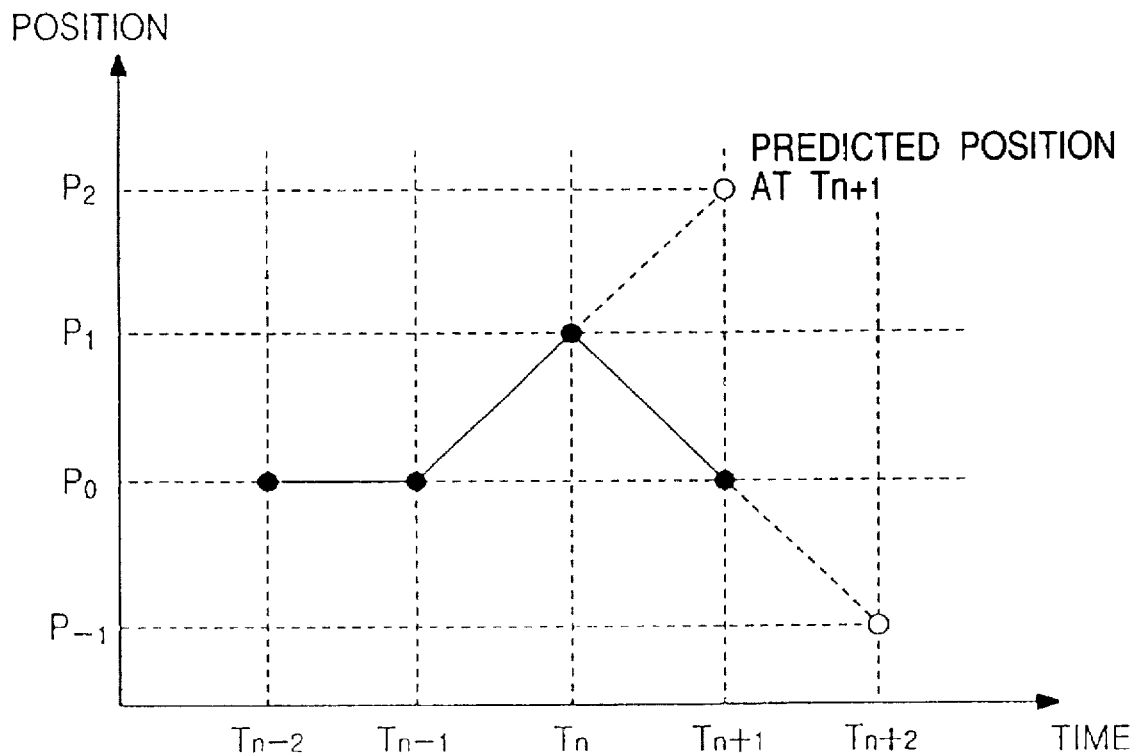
FIG. 31 is a graph illustrating the problem in the conventional delay time compensation.

In this embodiment, an output position when the position moves from a state of staying nearby the detection border across the border as shown in FIG. 30 is shown in FIG. 10. Because of $\Delta\theta n=1$ and $\Delta\theta(n-1)=0$ at time $T_n$, $\Delta\theta n=0$ is selected by the switch 22. Accordingly, output $\theta(T_{n+1})=\theta(T_n)=1$ is obtained. Similarly, $\theta(T_{n+2})=\theta(T_{n+1})=0$ is given, an incorrect output is fed back to the motor drive unit 2 as shown in FIG. 31 to prevent vibration of the motor from increasing. The behavior in low speed movement is such that the position output is smoothed to prevent increasing of the speed ripple in rotation of motor as shown in FIG. 12.

Thus, according to the first embodiment, the encoder output compensation means predicts a position change which occurs during the delay time required for sampling analog signals and outputting the position data, by selecting the smaller of the absolute values of the position change obtained in the current sampling and the position change obtained in the preceding sampling. The calculation is performed using the assumption that the position change in the sampling cycle linearly or curvilinearly changes in accordance with the selected position change. By compensating the position data in this manner, more accurate output position data is obtained.

Second Embodiment

Figure 6:
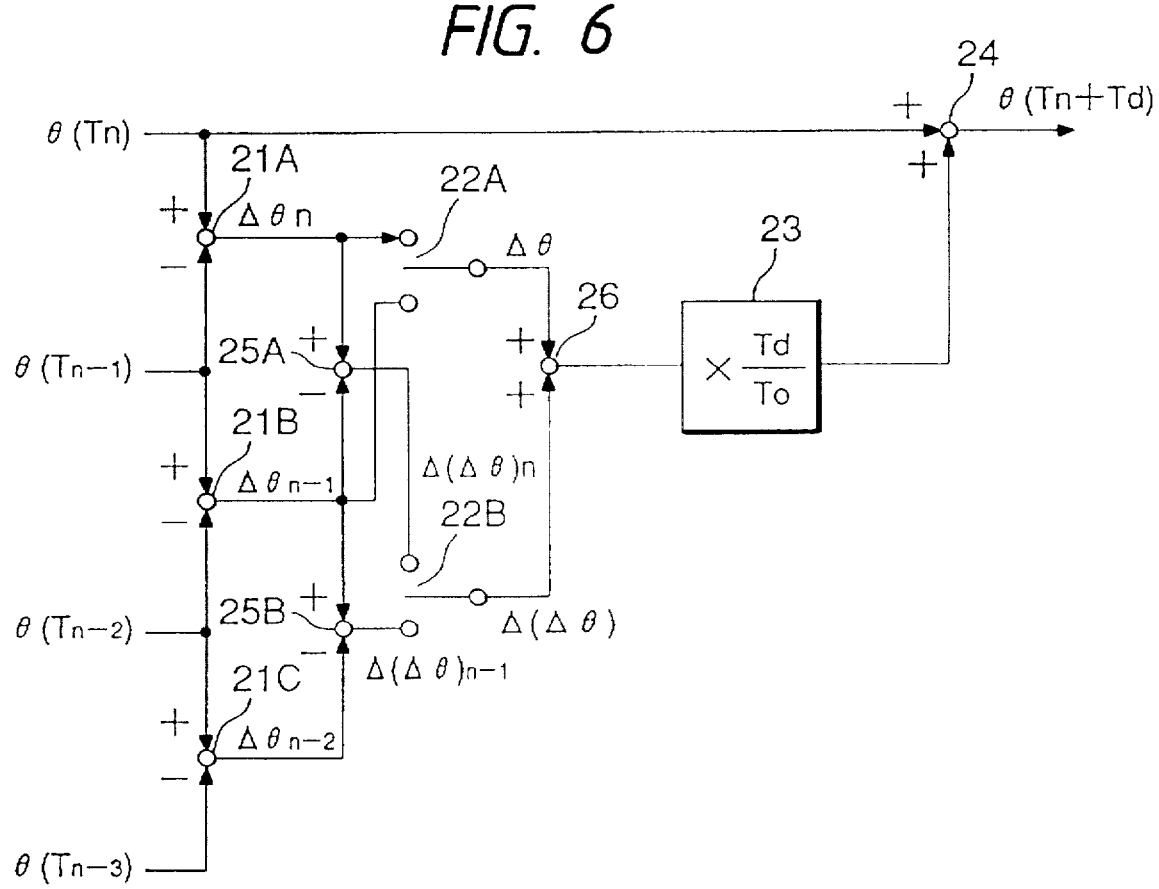
FIG. 6 is a block diagram showing the output compensation unit of the encoder unit according to the second embodiment of the present invention.

FIG. 6 is a configuration diagram showing an output compensation unit of an encoder unit according to a second embodiment of the present invention. In FIG. 6, the description of the same components as those of the output compensation unit of the first embodiment shown in FIG. 5 is omitted. The switch 22A selects the current position change $\Delta\theta$ as the switch 22 of the output compensation unit of the first embodiment. The subtractor 25A outputs a difference $\Delta(\Delta\theta n)$ between the position change $\Delta\theta n$ in the current sampling cycle and the position change $\Delta\theta(n-1)$ in the preceding cycle. The subtractor 25B outputs a difference $\Delta(\Delta\theta n-1)$ between the position change $\Delta\theta(n-1)$ in the preceding sampling cycle and the position change $\Delta\theta(n-2)$ in the n-2 sampling cycle. The switch 22B selects the smaller of $\Delta(\Delta\theta n)$ and $\Delta(\Delta\theta n-1)$ as $\Delta(\Delta\theta n)$ according to the flow chart shown in FIG. 7 (i.e., switch 22B operates in the same manner, with respect to its inputs, as switch 22 of the first embodiment). A sum of the selected position change $\Delta\theta$ and the increment $\Delta(\Delta\theta)$ of the position change is multiplied by $T_d/T0$ in the multiplier 23 to obtain a position change between $T_n$ and $T_n+T_d$. The delay time is compensated by adding the output thereof to $\theta(T_n)$ in the adder 24.

Figure 32:
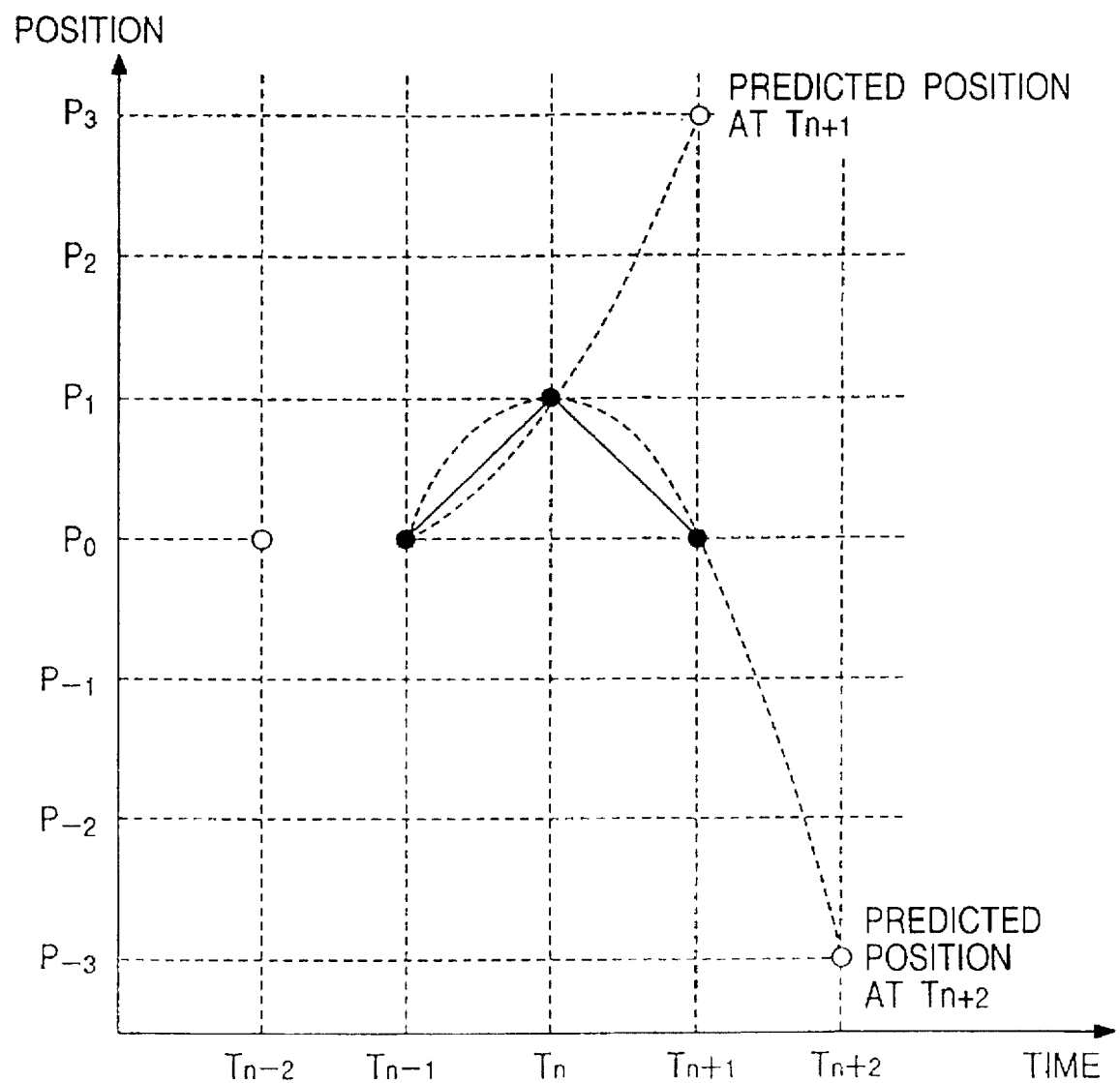
FIG. 32 is a graph illustrating the problem in the conventional delay time compensation.
Figure 33:
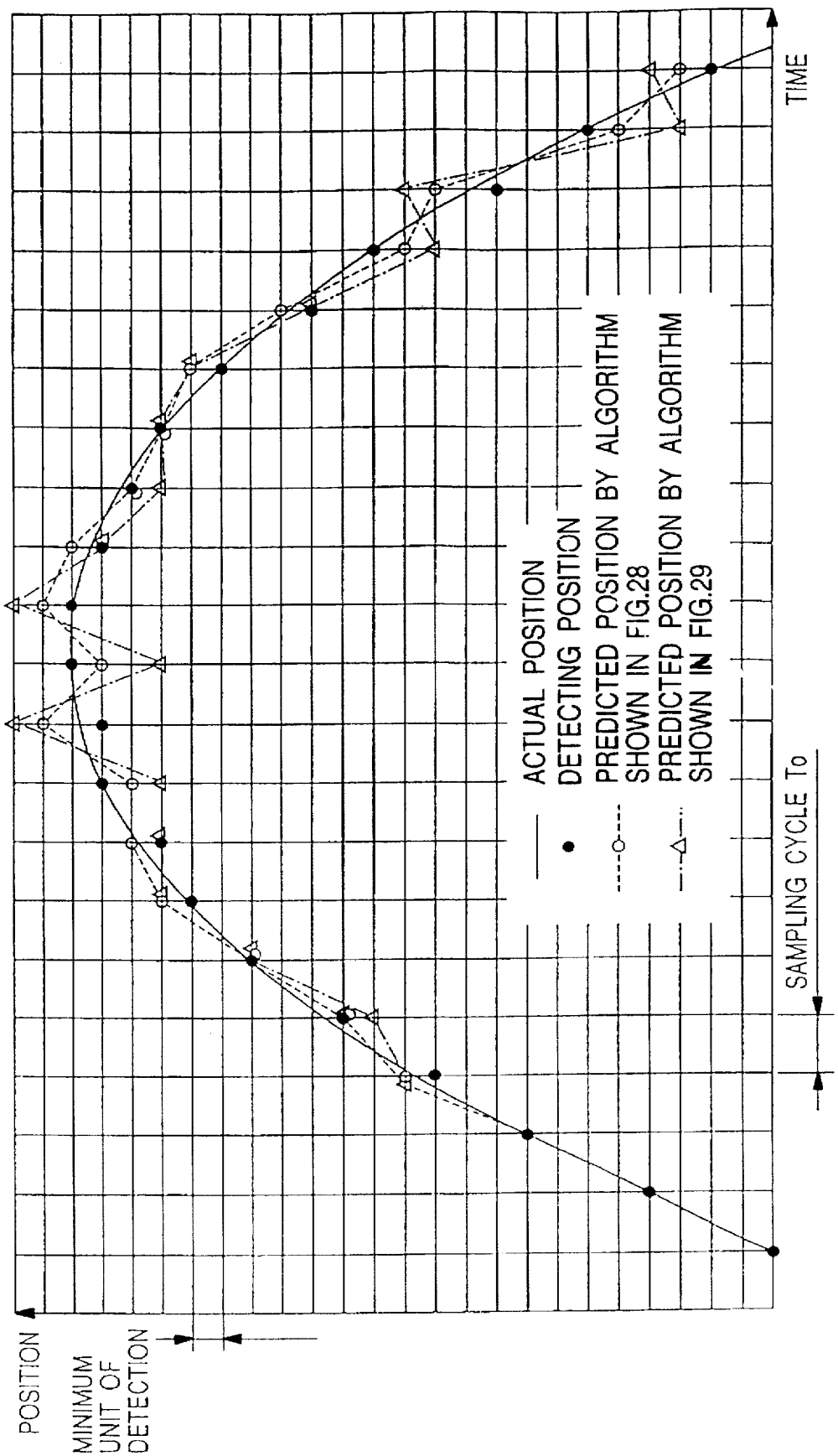
FIG. 33 is a graph illustrating the operation of the conventional delay time compensation.

In this embodiment, an output position when the position moves from a state of staying nearby the detection border across the border as shown in FIG. 30 is shown in FIG. 10. Because of $\Delta\theta n=1$ and $\Delta\theta(n-1)=0$ at time $T_n$, $\Delta\theta n=0$ is selected by the switch 22 and, because of $\Delta(\Delta\theta n)=1$ and $\Delta(\Delta\theta n-1)=0$, $\Delta(\Delta\theta)=0$ is selected by the switch 22B. Accordingly, output $\theta(T_{n+1})=1$ is obtained. Similarly, $\theta(T_{n+}$ 2)=0 is given, an incorrect output is fed back to the motor drive unit 2 as shown in FIG. 32 to prevent vibration of the motor from increasing. The behavior in low speed movement is such that the position output is smoothed to prevent increasing of the speed ripple in rotation of motor as shown in FIG. 12.

Thus, according to the second embodiment, the encoder output compensation means predicts a position change which occurs during the delay time required for sampling analog signals and outputting position data, by selecting the smaller of the absolute values of the position change in the current sampling cycle and the position change in the preceding sampling cycle and the smaller of a difference between the position change in the current sampling cycle and the position change in the preceding sampling cycle and a difference between the position change in the preceding sampling cycle and the position change in the n−2 sampling cycle. The calculation is performed under the assumption that the position change in the sampling cycle linearly or curvilinearly changes in accordance with a sum of the differences between selected position changes. By compensating the position data in this manner, more accurate output position data is obtained.

Third Embodiment

Figure 8:
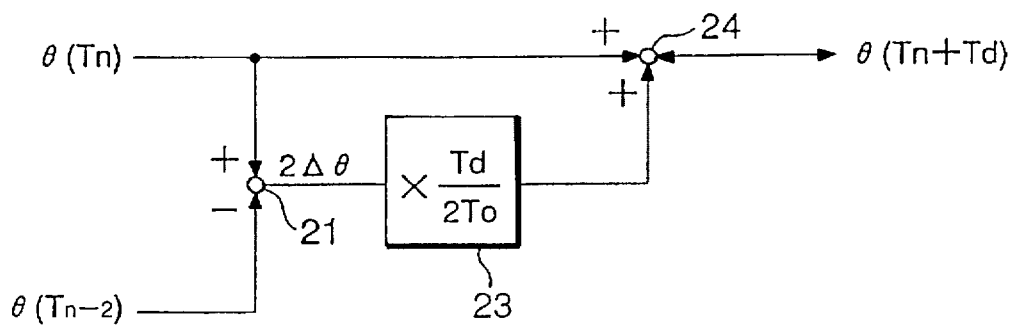
FIG. 8 is a block diagram showing the output compensation unit of the encoder unit according to the third embodiment of the present invention.

FIG. 8 is a configuration diagram showing an output compensation unit of an encoder unit according to a third embodiment of the present invention. The subtractor 21 outputs a difference between the current sampling position $\theta(T_n)$ and the n−2 sampling position $\theta(T_{n-2})$; that is, a position change $2\Delta\theta$ in two sampling cycles and enters it into the adder 23. An average position change of two sampling cycles is derived by multiplying by ½ in the multiplier 23 and simultaneously a position change between $T_n$ and $T_n+T_d$ is obtained by multiplying the output by $T_d/T0$. The delay time is compensated by adding the output thereof to $\theta(T_n)$ in the adder 24.

Figure 13:
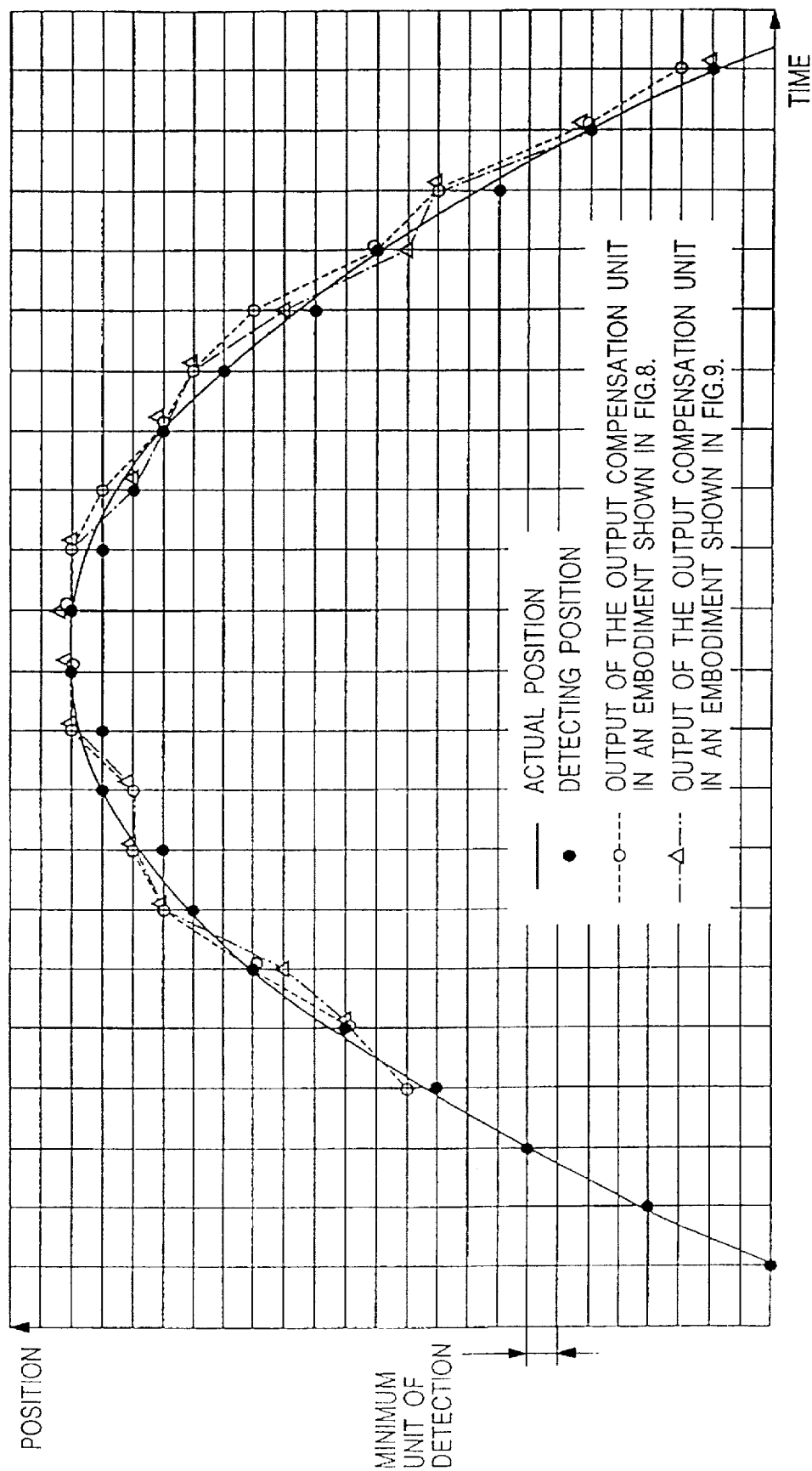
FIG. 13 is a graph showing the operation of the output compensation unit of the encoder unit according to the third and fourth embodiments of the present invention.

In this embodiment, an output position when the position moves from a state of staying nearby the detection border across the border as shown in FIG. 30 is shown in FIG. 10. The output at time $T_n$ is $2\Delta\theta n=1$ and the output $\theta(T_{n+1})=1$ is obtained by deleting the fraction of the mean value and adding it to $\theta(T_n)$. Similarly, $\theta(T_{n+2})=0$ is given, and an incorrect output is fed back to the motor drive unit 2 as shown in FIG. 31 to prevent vibration of the motor from increasing. The behavior in low speed movement is such that the position output is smoothed to prevent increasing of the speed ripple in rotation of motor as shown in FIG. 13.

Thus, according to the third embodiment, the encoder output compensation means predicts a position change which occurs during the delay time required for sampling analog signals and outputting position data, by assuming that the position change linearly or curvilinearly changes in accordance with a mean value of a position change in the current sampling cycle and a position change in the preceding sampling cycle. By compensating the position data in this manner, more accurate output position data is obtained.

Fourth Embodiment

Figure 9:
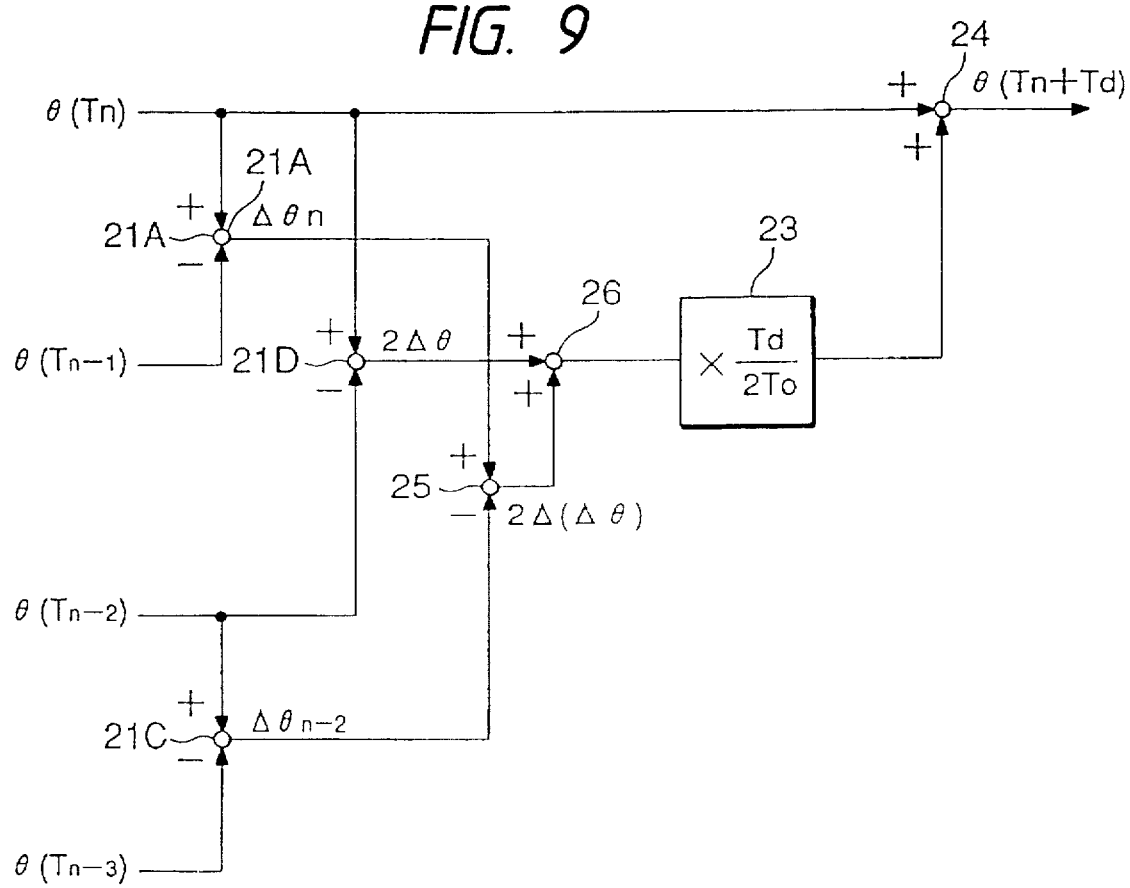
FIG. 9 is a block diagram showing the output compensation unit of the encoder unit according to the fourth embodiment of the present invention.

FIG. 9 is a configuration diagram showing an output compensation unit of an encoder unit according to a fourth embodiment of the present invention. The subtractor 21D performs the same operation as the subtractor 21 of the output compensation unit of the previous embodiment and outputs the position change $2\Delta\theta$ in two sampling cycles. The subtractor 21A outputs the position change $\Delta\theta n$ in the current sampling cycle, the subtractor 21C outputs the position change $\Delta\theta(n-2)$, and subtractor 25 outputs a variation component $2\Delta(\Delta\theta)$ of the position change in two sampling cycles. $2\Delta\theta$ and $2\Delta(\Delta\theta)$ are added in the adder 26 and entered into the multiplier 23. An average position change and the variation component of the position change of two sampling cycles are derived by multiplying the output by ½ in the multiplier 23 and simultaneously a position change between $T_n$ and $T_n+T_d$ is obtained by multiplying the output by $T_d/T0$. The delay time is compensated by adding the output thereof to $\theta(T_n)$ in the adder 24.

Figure 11:
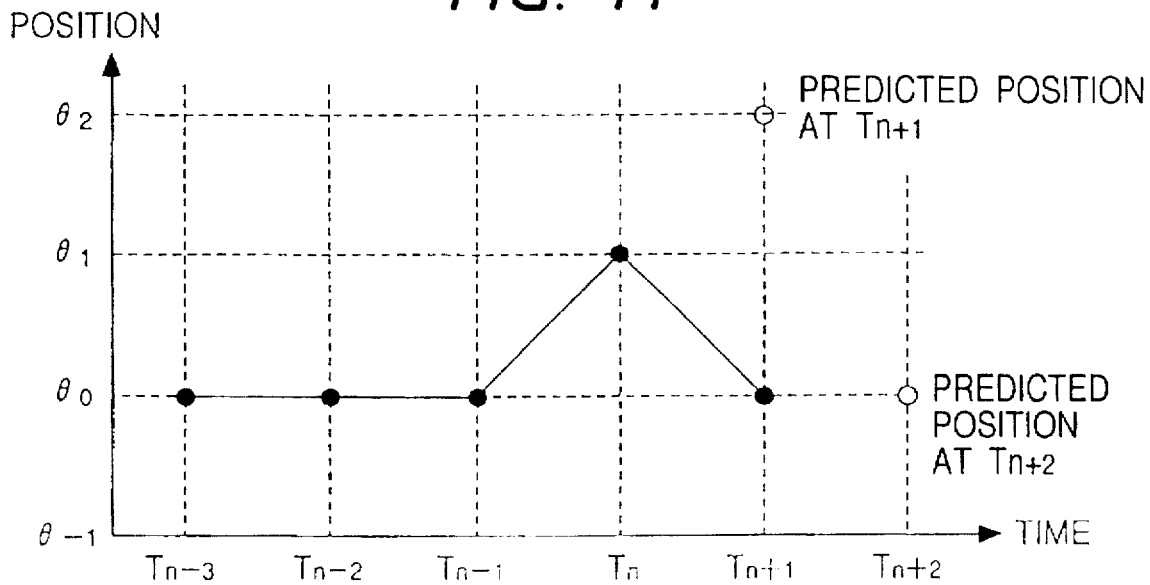
FIG. 11 is a graph showing the operation at a position nearby the detection border of the output compensation unit of the encoder unit according to the fourth embodiment of the present invention.

In this embodiment, an output position when the position moves from a state of staying nearby the detection border across the border as shown in FIG. 30 is shown in FIG. 11. $2\Delta\theta=1$ and $2\Delta(\Delta\theta)=1$ at time $T_n$ are added to the mean value $\theta(T_{n+1})$ to obtain $\theta(T_{n+1})=2$. Similarly, $\theta(T_{n+2})=0$ is given, and an incorrect output is fed back to the motor drive unit 2 as in the conventional example shown in FIG. 32 to prevent vibration of the motor from increasing. The behavior in low speed movement is such that the position output is smoothed to prevent increasing of the speed ripple in rotation of motor as shown in FIG. 13.

Thus, according to the fourth embodiment, the encoder output compensation means predicts a position change which occurs during a delay time required for sampling analog signals and outputting position data, by assuming that the position change linearly or curvilinearly changes in accordance with a sum of the mean value of the position changes obtained from the position changes in the current and preceding sampling cycles and a mean value of the differences of position changes in the preceding and the n−2 sampling cycles. By compensating the position data in this manner, more accurate output position data is obtained.

Fifth Embodiment

Figure 14:
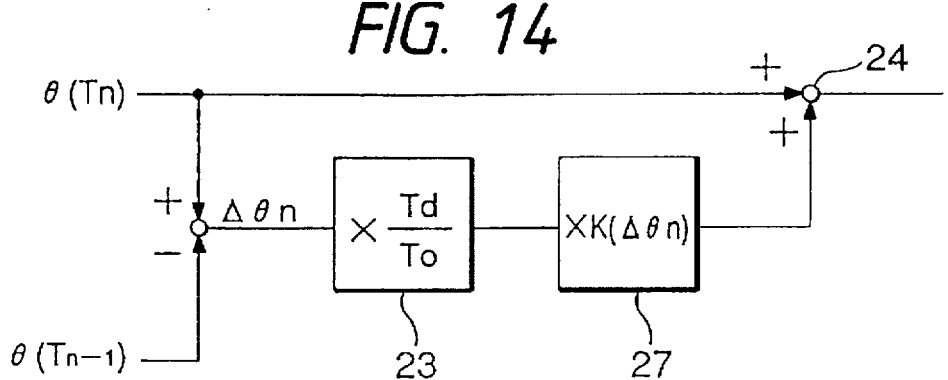
FIG. 14 is a block diagram showing the output compensation unit of the encoder unit according to the fifth embodiment of the present invention.
Figure 28:
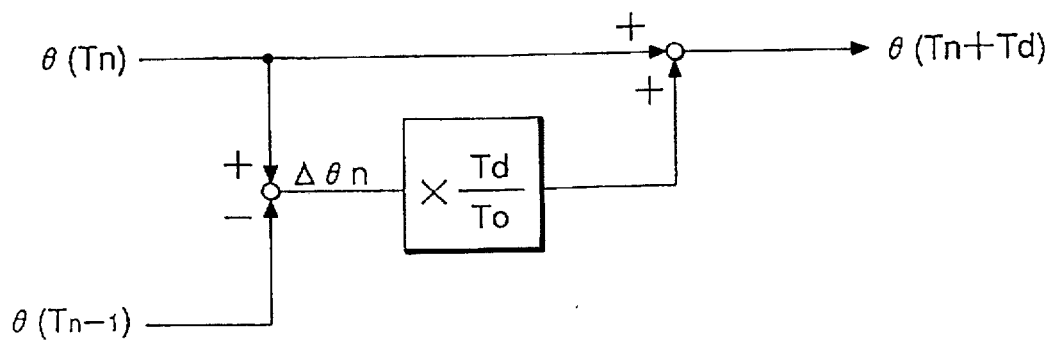
FIG. 28 is a block diagram showing the configuration when the conventional delay time compensation applies to the encoder unit.
Figure 29:
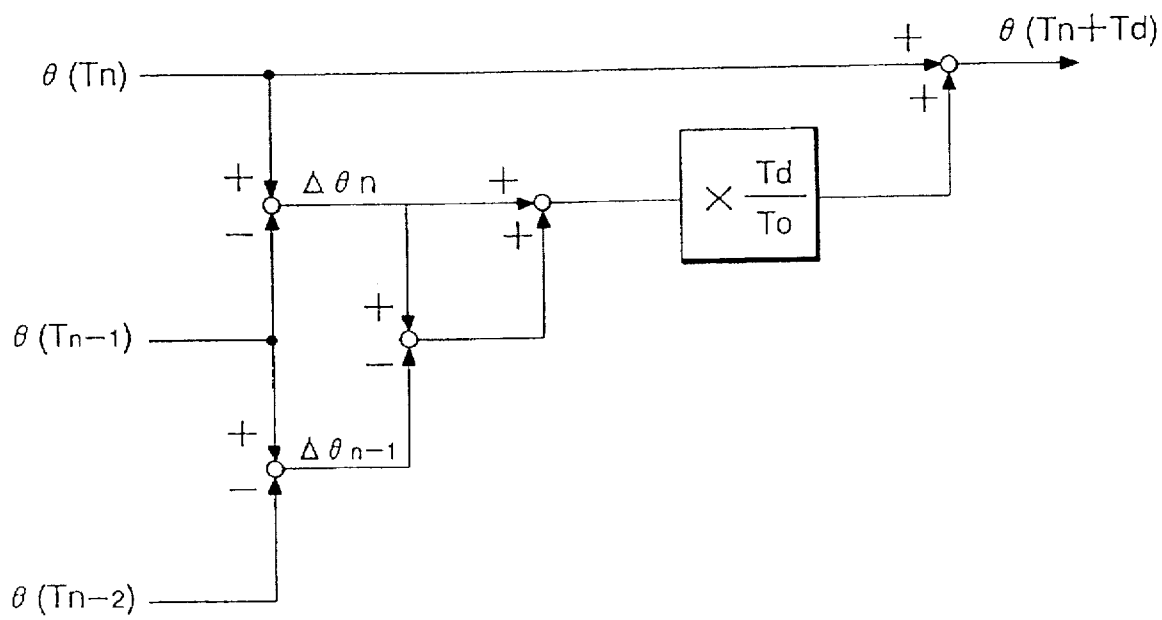
FIG. 29 is a block diagram showing the configuration when the conventional delay time compensation applies to the encoder unit.

FIG. 14 is a configuration diagram showing an output compensation unit of an encoder unit according to a fifth embodiment of the present invention. The description of the same component as those of the output compensation unit shown in FIG. 28 is omitted. Reference numerals 27 is a second multiplier which multiplies the output of the multiplier 23 by $K(\Delta\theta n)$ and the output thereof is added to $\theta(T_n)$ by the adder 24 to compensate the delay time. In this case, the multiplier 27 is a variable multiplier for which the magnification $K(\Delta\theta n)$ is varied with the value of $\Delta\theta n$. This multiplier $K(\Delta\theta n)$ is set to be large when the position change during the sampling interval is large and to be small when the position change during the sampling interval is small. In other words, by additionally providing this variable multiplier, the magnification of compensation is set to be small for low speed operation in which the effect of the delay time is small and a slight detection error may adversely affect the control loop to increase vibration and speed unevenness, and to be large for high speed operation in which the effect of the delay time is large and a slight detection error rarely adversely affects the control loop. Therefore, such problems as the increase of vibration due to the conventional delay time compensation will be solved while simultaneously solving a problem due to the delay time.

Figure 15:
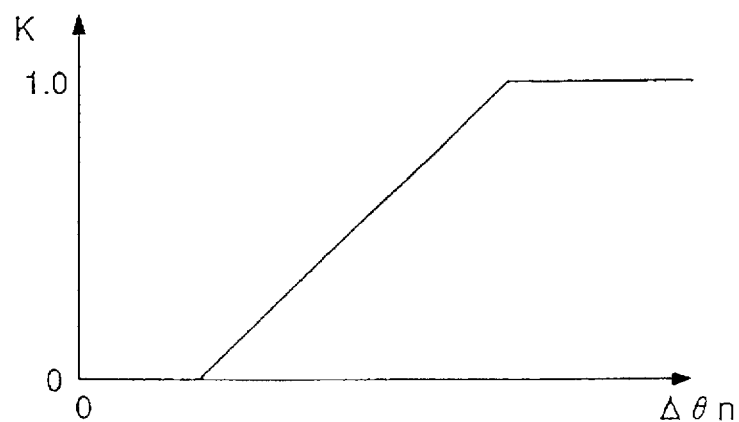
FIG. 15 is a graph showing an operation example of the variable multiplier of the output compensation unit shown in FIG. 14.
Figure 16:
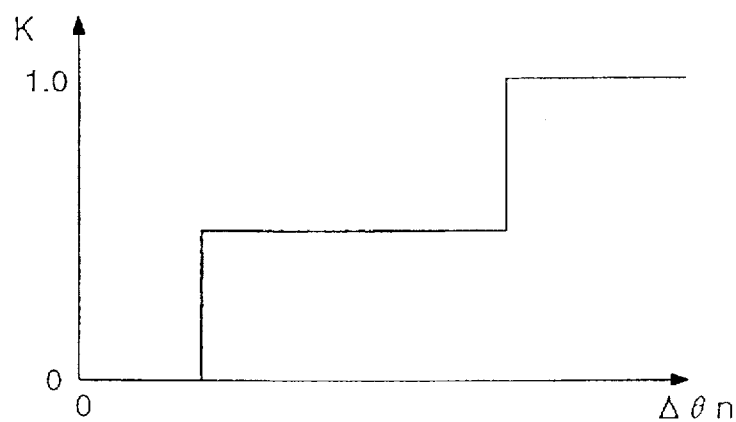
FIG. 16 is a graph showing another operation example of the variable multiplier of the output compensation unit shown in FIG. 14.

FIGS. 15 and 16 are respectively a graph showing an operation example of the variable multiplier 27, and the magnification 0 to 1 can be continuously varied in reference to $\Delta\theta$ as shown in FIG. 15 or can be changed over in a plurality of steps as two steps or more as shown in FIG. 16. Though the predicting of the position has been described in the first through fifth embodiments on the assumption that the position linearly changes, the configuration can be made so that the position curvilinearly changes.

Thus, according to the fifth embodiment, the encoder output compensation means predicts a position change which occurs during the delay time required for sampling analog signals and outputting position data, based on the position data obtained in the current and preceding and earlier sampling cycles. The encoder output compensation means is provided with a variable multiplier to obtain more accurate position output by reducing the predicted position change when the position change in the current sampling cycle is small.

Sixth Embodiment

Figure 17:
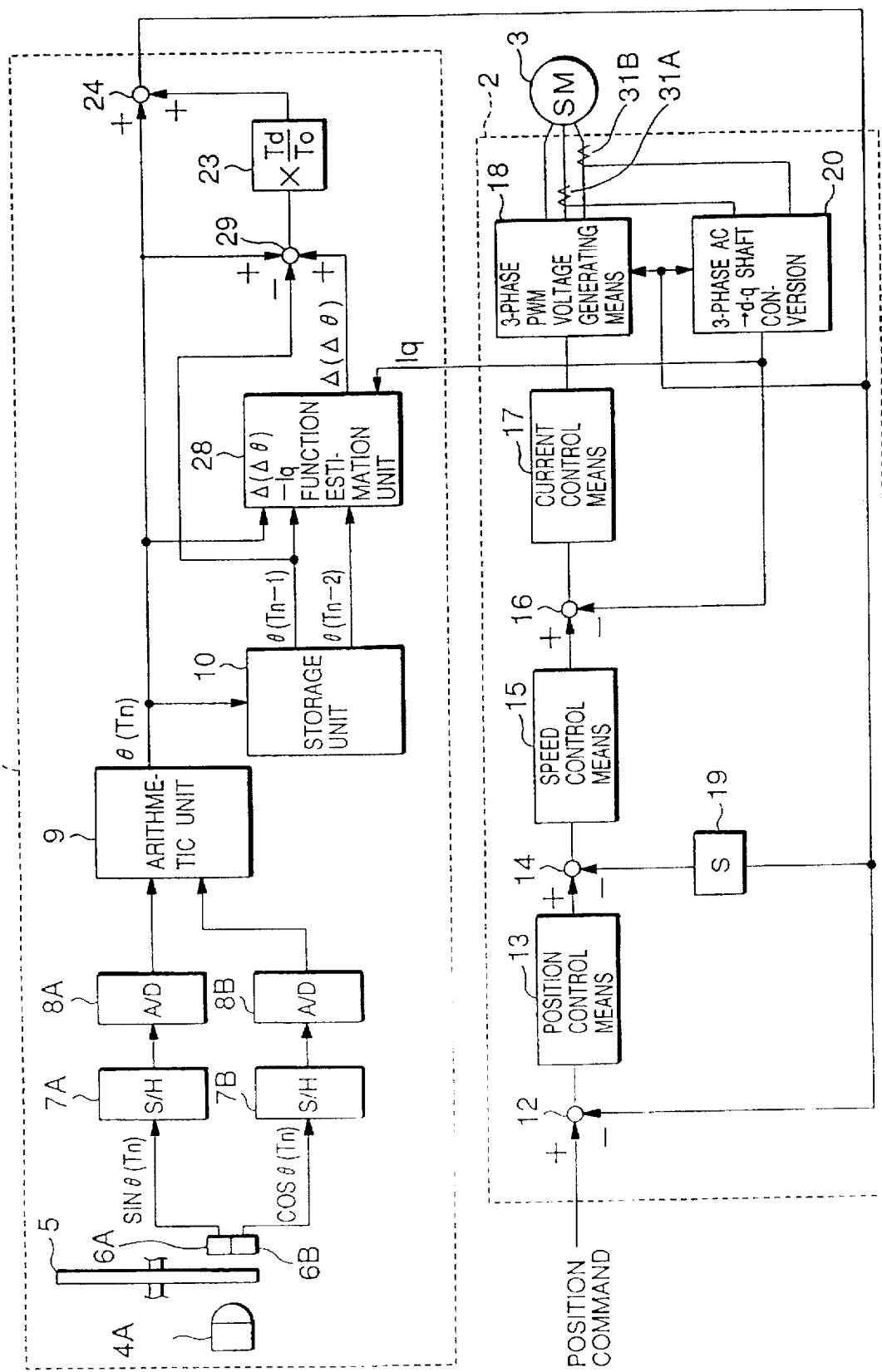
FIG. 17 is a block diagram showing the encoder unit and the servo motor control unit according to the sixth embodiment of the present invention.

FIG. 17 is a configuration diagram showing an encoder unit and a servo motor control unit according to a sixth embodiment of the present invention. The common components of the encoder unit and the servo motor control unit to those according to the embodiment 1 shown in FIG. 1 are given the same reference numerals and the description thereof is omitted. Reference numeral 28 denotes a $\Delta(\Delta\theta)$-Iq function estimation unit which obtains a variation $\Delta(\Delta\theta)$ of the position change from the sampling position data $\theta(T_n)$ and the two preceding sampling position data $\theta(T_{n-1})$ and $\theta(T_{n-2})$ which are stored in the storage unit 10. The $\Delta(\Delta\theta)$ –Iq function estimation unit estimates a function between the current value Iq outputted from the motor drive unit and the variation $A(\Delta\theta)$ as given below.

$$\Delta(\Delta\theta)=f(Iq)$$

Figure 18:
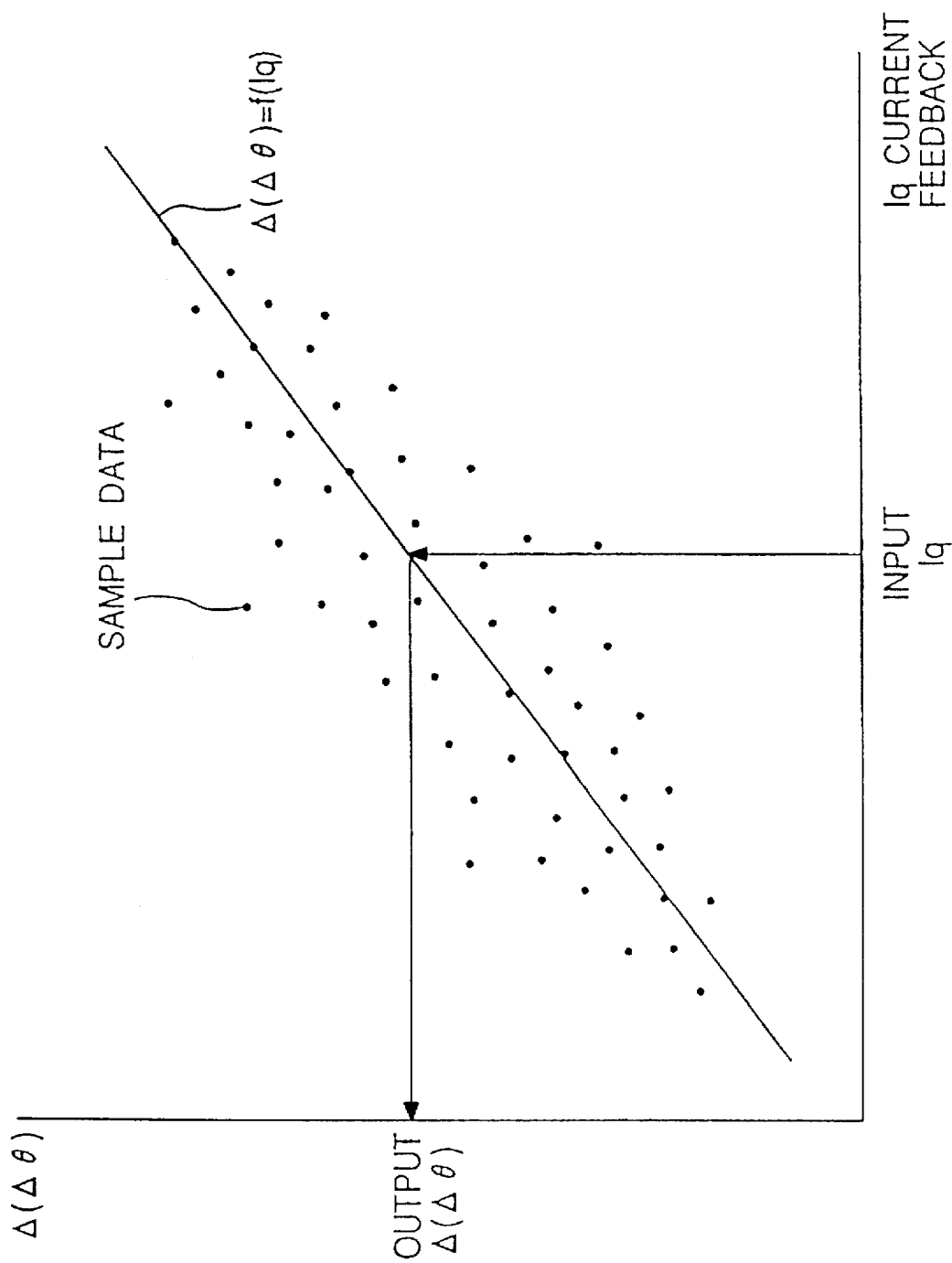
FIG. 18 is a graph illustrating the function estimation unit of the encoder unit shown in FIG. 17.

A function which represents a substantially average gradient of the relationship between $\Delta(\Delta\theta)$ sampled as shown in FIG. 18 and Iq is estimated. The function estimation unit 28 outputs the variation $\Delta(\Delta\theta)$ of the current position change from Iq based on the estimated function. A sum of $\theta(T_n)$–$\theta(T_{n-1})=\Delta\theta$ and the output $\Delta(\Delta\theta)$ of the function estimation unit 28 is outputted by the adder/subtractor 29 and the position change during the delay time $T_d$ is obtained by multiplying the output thereof by $T_d/T0$. The position change obtained is added to $\theta(T_n)$ by the adder 24 to compensate the delay time. The function to be estimated by the function estimation unit 28 may be a quadratic or higher order function.

Thus, according to the sixth embodiment, the encoder output compensation means evaluates in advance a relationship between a value of the current to be outputted from the motor drive unit and a degree of variation of the position change in the sampling cycle, the position change which occurs during the delay time is predicted from the evaluated relationship, the present current value and position data. By compensating the position data in this manner, more accurate output position data is obtained.

Seventh Embodiment

Figure 19:
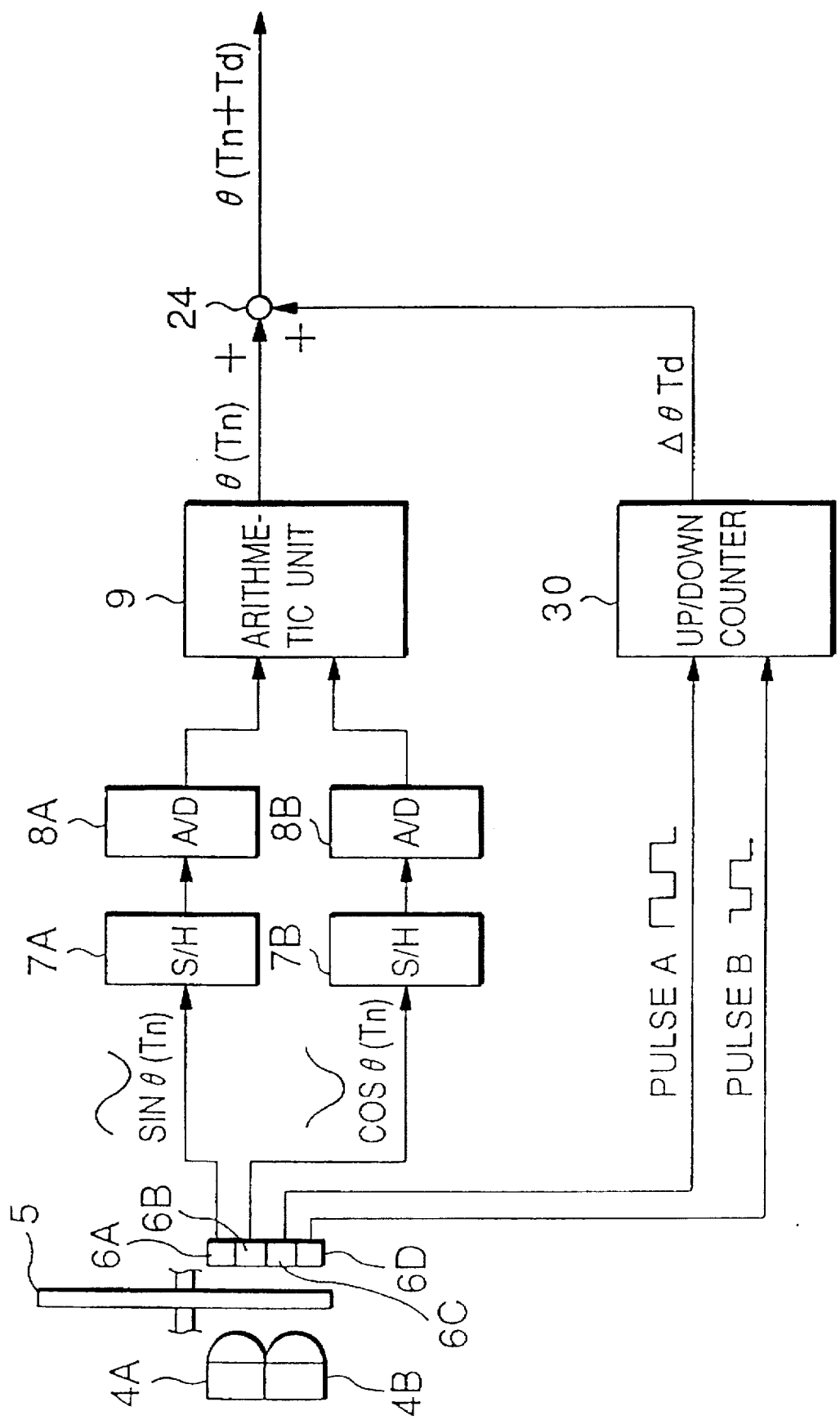
FIG. 19 is a block diagram showing the encoder unit according to the seventh embodiment of the present invention.
Figure 20:
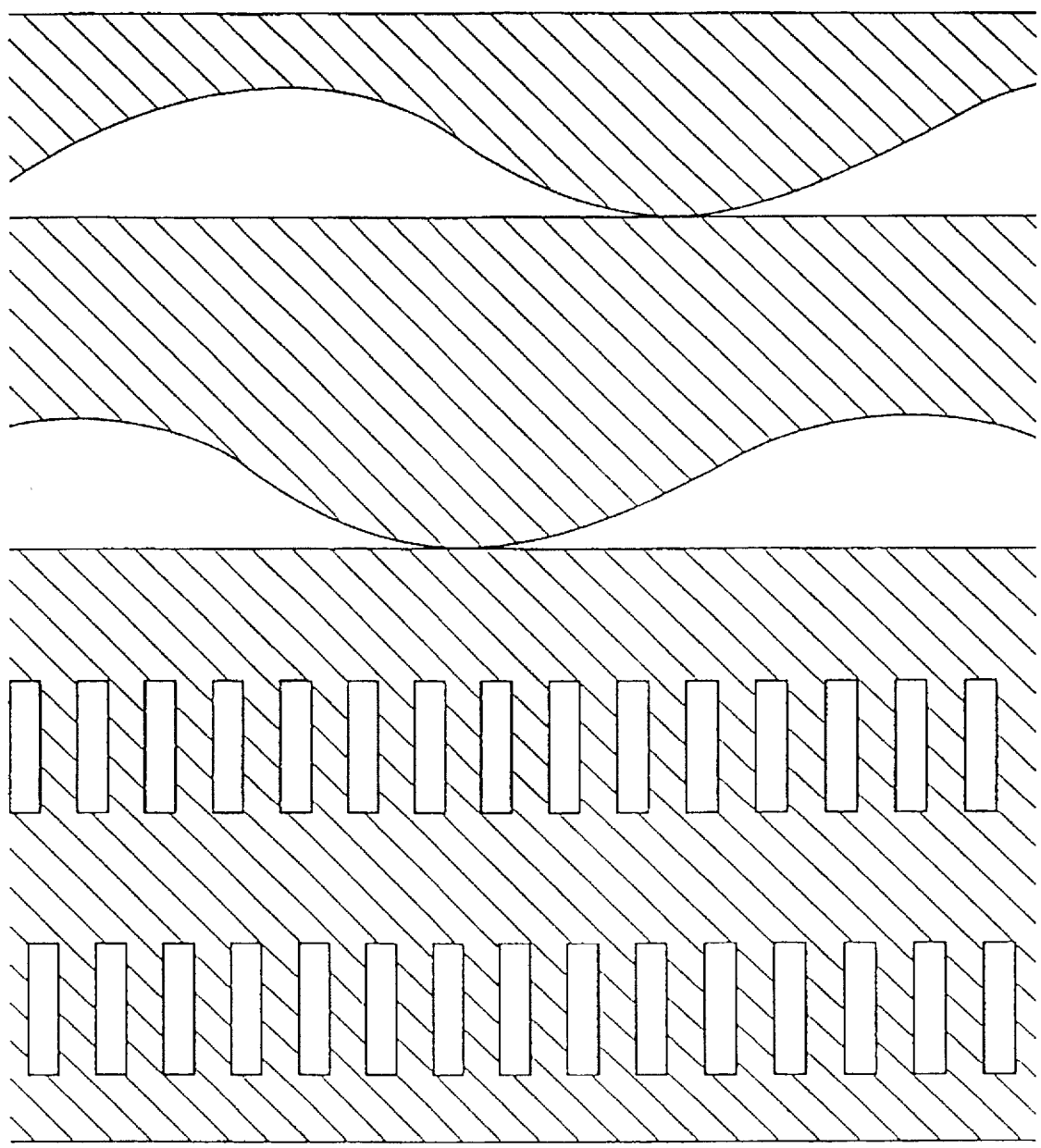
FIG. 20 is an illustration showing the shield plate of the encoder unit shown in FIG. 19.
Figure 21:
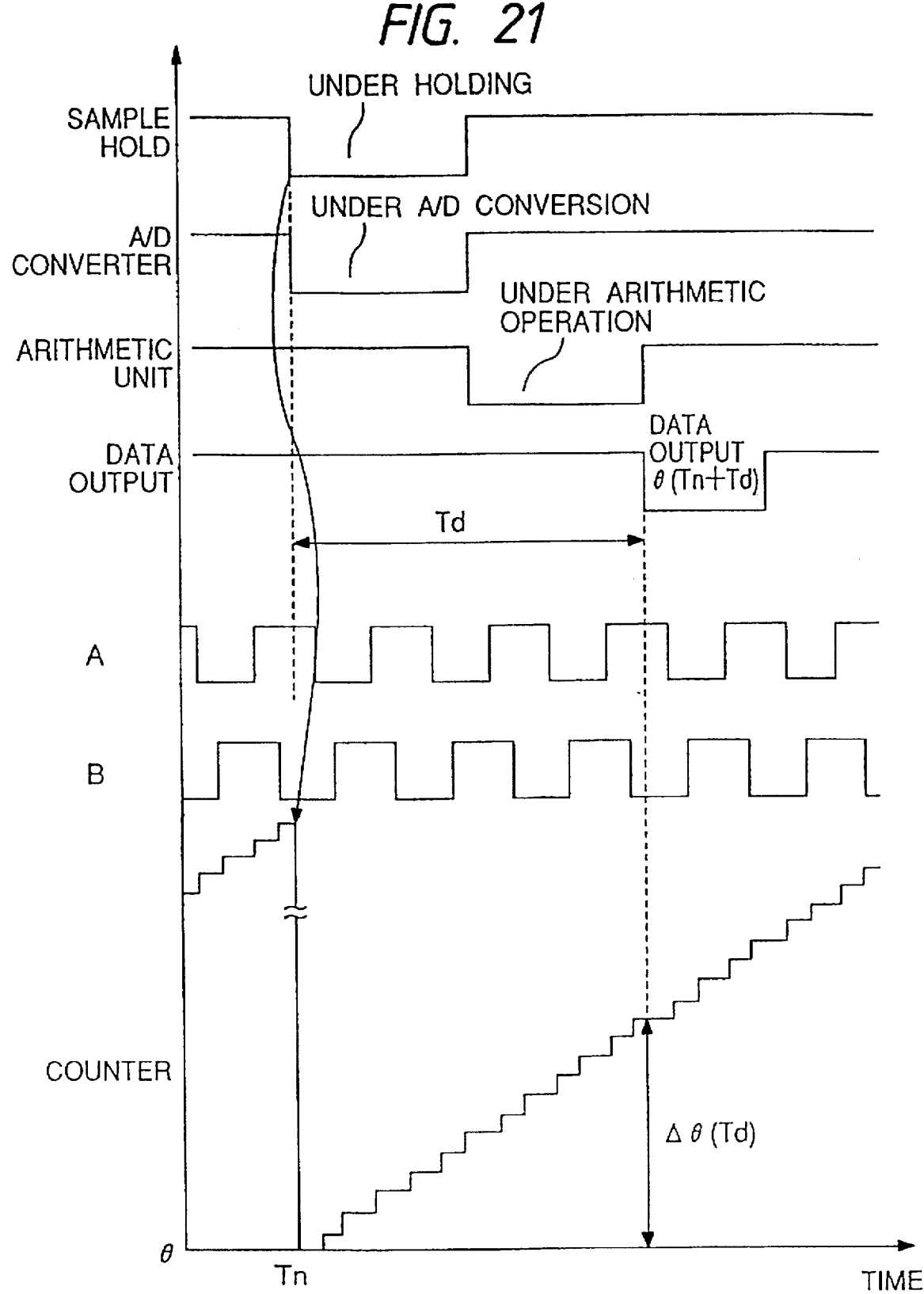
FIG. 21 is a timing chart showing the operation of the encoder unit shown in FIG. 19.

FIG. 19 is a configuration diagram showing an encoder unit according to a seventh embodiment of the present invention. In FIG. 19, those common components to the encoder unit shown in FIG. 1 are given the same reference numerals and the description thereof is omitted. An LED comprises 4A and 4B and light receiving devices 6C and 6D are added. The patterns of the shield plate 5 are formed in parallel for generating analog signals and pulse train signals as shown in FIG. 20. In FIG. 20, the shaded part shields the light. Analog signals to be outputted from the light receiving devices 6A and 6B are converted to position data $\theta(T_n)$ which will be processed as in the conventional example. The pulses of pulses trains A and B to be outputted from the light receiving devices 6C and 6D have a phase difference of 90° and are counted by the up/down counter 30. FIG. 21 shows data processing timings of the encoder unit shown in FIG. 19. The up/down counter 30 is cleared to zero at the same time as the sample-and-hold circuits 7A and 7B hold the sampling data and subsequently counts pulses A and B. The A/D conversion time and the arithmetic processing time $T_d$ are compensated by adding the count number $\Delta\theta(T_d)$ of the counter 30 during time $T_d$ up to completion of arithmetic processing of the arithmetic unit 9 to the output of the arithmetic unit 9 in the adder 24. The configuration as described above enables to output those data free from the delay time. A position change for a time required for serial output can be estimated from $\Delta\theta(T_d)$ and the position change in the communication time can be compensated.

Thus, according to the seventh embodiment, the encoder unit, which samples analog signals in accordance with a rotation angle of the revolving shaft and obtains the rotation angle of the revolving shaft from converted digital data, is provided with: pulse signal generating means for generating two pulse trains having pulses whose phases are offset by 90° relative to each other; a counter for counting a number of pulses of the pulse trains to measure a delay rotation angle through which said shaft rotates during a time period required for the A/D converter to sample the analog signals and for the arithmetic operation means to determine the rotation angle; and encoder output compensation means for outputting a current angle as a sum of the rotation angle and the delay rotation angle. The encoder unit can accurately compensate for the delay time required for A/D conversion and arithmetic processing, regardless of the behavior of the motor speed and the acceleration, and the increase of delay time of the control loop and the error of magnetic pole detection can be eliminated.

As described above, a servo control unit according to the present invention comprises an encoder unit for sampling analog signals in accordance with a position of a detection object and obtaining position data from converted digital data. The encoder unit includes an encoder output compensation unit which predicts a position change of the detection object during the delay time required for sampling the analog signals and outputting the position data. The encoder output compensation unit uses the position data obtained from the current sampling and the position data obtained from preceding samplings, and outputs the predicted position change as well as accurate position data obtained by adding the predicted position change to the position data obtained from the current sampling. The encoder output compensation unit also provides as an output the position data obtained from the current sampling (uncompensated). Since, in the present invention, it is acceptable for the delay time required for A/D conversion, arithmetic processing and communication to be relatively long, low cost A/D conversion means and arithmetic operation means can be used. Arithmetic operation means and output compensation means can be realized with a central processing unit (CPU) and a micro processor unit (MPU), respectively; therefore, the cost increase of the output compensation means can be offset. In addition, for example, communication with the motor drive unit need not be speeded up excessively.

The servo motor control unit according to the present invention further comprises: a motor drive unit for driving the servo motor which is provided with position control means; speed control means; conversion means; current control means and voltage control means. A speed command value is generated by the position control means with a low loop gain in accordance with a difference between the position command value and the currently sampled position data the encoder unit outputs. A command value of the current is generated by the speed control means with a high loop gain in accordance with a difference between a speed command value and the speed feedback value obtained from the predicted position change output by the encoder unit. A 3-phase alternating current detected from the servo motor is converted to a torque component current, using predicted position data. The voltage command value is generated in accordance with a difference between a current command value and a feedback value of the current (the torque component current) (for conversion in response to the current magnetic pole position when the servo motor is a synchronous motor) entered by the conversion means. A 3-phase voltage is generated in response to the current magnetic pole position in accordance with the voltage command value and the predicted position data. Therefore, the servo motor can be accurately controlled without any increase of vibration and speed unevenness of the servo motor.

What is claimed is:

1. An encoder unit, comprising:

signal generating means for generating analog signals in accordance with a position of a detected object;

A/D conversion means for sampling the analog signals and converting the analog signals to digital data;

arithmetic operation means for generating position data of the detected object from the digital data; and encoder output compensating means which uses the position data obtained from current sampling and preceding samplings to predict a position change of the detected object occurring during a delay time required for sampling the analog signals and outputting the position data, said encoder output compensation means generating predicted position data by adding the predicted position change to currently sampled position data, wherein said encoder output compensation means predicts the predicted position change by selecting the smaller of an absolute value of a position change occurring during a current sampling cycle and an absolute value of a position change occurring during a preceding sampling cycle, and by assuming that position changes occurring during sampling cycles are linear or curvilinear in accordance with the selected position change.

2. An encoder unit, comprising:

signal generating means for generating analog signals in accordance with a position of a detected object;

A/D conversion means for sampling the analog signals and converting the analog signals to digital data;

arithmetic operation means for generating position data of the detected object from the digital data; and encoder output compensating means which uses the position data obtained from current sampling and preceding samplings to predict a position change of the detected object occurring during a delay time required for sampling the analog signals and outputting the position data, said encoder output compensation means generating predicted position data by adding the predicted position change to currently sampled position data, wherein said encoder output compensation means predicts the predicted position change by selecting the smaller of an absolute value of a position change occurring during a current sampling cycle and an absolute value of a position change occurring during a preceding sampling cycle, and by selecting the smaller of a difference between a position change occurring during the current sampling cycle and a position change occurring during the preceding sampling cycle and a difference between the position change occurring during the preceding sampling cycle and a position change occurring during a sampling cycle preceding the preceding sampling cycle, and by assuming that position changes occurring during sampling cycles are linear or curvilinear in accordance with a sum of the selected position change and the selected difference between position changes.

3. An encoder unit, comprising:

signal generating means for generating analog signals in accordance with a position of a detected object;

A/D conversion means for sampling the analog signals and converting the analog signals to digital data;

arithmetic operation means for generating position data of the detected object from the digital data; and encoder output compensating means which uses the position data obtained from current sampling and preceding samplings to predict a position change of the detected object occurring during a delay time required for sampling the analog signals and outputting the position data, said encoder output compensation means generating predicted position data by adding the predicted position change to currently sampled position data, wherein said encoder output compensation means predicts the predicted position change by assuming that position changes occurring during sampling cycles are linear or curvilinear in accordance with a mean value of a position change occurring during a current sampling cycle and a position change occurring during a preceding sampling cycle.

4. An encoder unit, comprising:

signal generating means for generating analog signals in accordance with a position of a detected object;

A/D conversion means for sampling the analog signals and converting the analog signals to digital data;

arithmetic operation means for generating position data of the detected object from the digital data; and encoder output compensating means which uses the position data obtained from current sampling and preceding samplings to predict a position change of the detected object occurring during a delay time required for sampling the analog signals and outputting the position data, said encoder output compensation means generating predicted position data by adding the predicted position change to currently sampled position data, wherein said encoder output compensation means predicts the predicted position change by assuming that position changes occurring during sampling cycles are linear or curvilinear in accordance with a sum of: a mean value of a position change occurring during a current sampling cycle and a position change occurring during a preceding sampling cycle; and a mean value of a difference between the position change occurring during the current sampling cycle and the position change occurring during the preceding sampling cycle and a difference between the position change occurring during the preceding sampling cycle and a position change occurring during a sampling cycle preceding the preceding sampling cycle.

5. An encoder unit, comprising:

signal generating means for generating analog signals in accordance with a position of a detected object;

A/D conversion means for sampling the analog signals and converting the analog signals to digital data;

arithmetic operation means for generating position data of the detected object from the digital data; and encoder output compensating means which uses the position data obtained from current sampling and preceding samplings to predict a position change of the detected object occurring during a delay time required for sampling the analog signals and outputting the position data, said encoder output compensation means generating predicted position data by adding the predicted position change to currently sampled position data, wherein said encoder output compensation means predicts the predicted position change from position data obtained from a current sampling cycle and preceding sampling cycles, and comprises a variable multiplier which reduces the predicted position change when a position change in the current sampling cycle is small.

6. An encoder unit, comprising:

signal generating means for generating analog signals in accordance with a position of a detected object;

A/D conversion means for sampling the analog signals and converting the analog signals to digital data;

arithmetic operation means for generating position data of the detected object from the digital data; and encoder output compensating means which uses the position data obtained from current sampling and preceding samplings to predict a position change of the detected object occurring during a delay time required for sampling the analog signals and outputting the position data, said encoder output compensation means generating predicted position data by adding the predicted position change to currently sampled position data, wherein said encoder output compensation means evaluates in advance a relationship between a current value to be outputted from a motor drive unit and a degree of variation in position changes in sampling cycles, and predicts the predicted position change based upon the evaluated relationship and a present current value and position data.

7. An encoder unit, comprising:

signal generating means for generating analog signals corresponding to a rotation angle of a revolving shaft;

A/D conversion means for sampling said analog signals and converting said analog signals to digital data;

arithmetic operation means for determining a rotation angle of said revolving shaft from the digital data;

pulse signal generating means for generating two pulse trains having pulses whose phases are offset by 90° relative to each other;

a counter for counting a number of said pulses of said pulse trains to measure a delay rotation angle through which said shaft rotates during a time period required for said A/D converting means to sample said analog signals and for said arithmetic operation means to determine said rotation angle; and encoder output compensation means for outputting a current angle as a sum of said rotation angle and said delay rotation angle.

\* \* \* \* \*